United States Patent [19]

Galafassi et al.

[11] Patent Number: 5,356,440
[45] Date of Patent: Oct. 18, 1994

[54] PROCESS FOR THE DYEING OF SYNTHETIC POLYAMIDE FIBRE MATERIALS

[75] Inventors: Pierre Galafassi, Hegenheim; Jean-Marie Adam, Rosenau, both of France

[73] Assignee: Ciba-Geigy Corporation, Ardsley, N.Y.

[21] Appl. No.: 96,143

[22] Filed: Jul. 22, 1993

[30] Foreign Application Priority Data

Jul. 31, 1992 [CH] Switzerland .................. 2414/92-3

[51] Int. Cl.$^5$ .................. D06P 1/384; C09B 62/527; C09B 62/53

[52] U.S. Cl. .................. 8/543; 8/544; 8/549; 8/643; 8/679; 8/639; 8/641; 534/641; 534/642; 534/593; 534/887

[58] Field of Search .................. 8/543, 544, 549, 639, 8/641, 643, 679

[56] References Cited

U.S. PATENT DOCUMENTS

| | | | |
|---|---|---|---|
| 3,170,912 | 2/1965 | Freyermuth et al. | 260/163 |
| 3,531,459 | 9/1970 | Chiddix et al. | 260/163 |
| 3,951,944 | 4/1976 | Fuchs | 260/186 |
| 4,036,825 | 7/1977 | Fuchs et al. | 260/196 |
| 4,271,072 | 6/1981 | Wenghoefer et al. | 260/207.3 |
| 4,430,259 | 2/1984 | Mischke et al. | 260/186 |
| 4,652,634 | 3/1987 | Mischke et al. | 534/642 |
| 4,693,727 | 9/1987 | Bowles et al. | 8/549 |
| 5,003,052 | 3/1991 | Tzikas | 534/641 |
| 5,023,325 | 6/1991 | Tzikas et al. | 534/618 |

FOREIGN PATENT DOCUMENTS

| | | |
|---|---|---|
| 0518075 | 5/1982 | European Pat. Off. . |
| 061151 | 9/1982 | European Pat. Off. . |
| 197418 | 10/1986 | European Pat. Off. . |
| 208655 | 1/1987 | European Pat. Off. . |
| 277624 | 8/1988 | European Pat. Off. . |
| 292825 | 11/1988 | European Pat. Off. . |
| 385204 | 9/1990 | European Pat. Off. . |
| 1233820 | 2/1967 | Fed. Rep. of Germany . |
| 4018666 | 12/1990 | Fed. Rep. of Germany . |
| 2006305 | 12/1969 | France . |
| 1271301 | 4/1972 | United Kingdom . |

OTHER PUBLICATIONS

Derw. Abst. 90-261845[35]Of EP385,204 (1990).
Derw. Abst. 68-61748P/00 Of DE 1,233,820 (1968).
Derw. Abst. 88-339410/48 Of EP292,825 (1988).
Chem. Abst. vol. 98, (1983) 108872y.
Derw. Abst. 91-000770/01 Of DE4,018,666 (1991).
Chem. Abst. 97:40293g (1982).
Chem. Abst. 100:87173p (1984).
Derw. Abst. 86-273362/42 Of EP197,418 (1986).
Derw. Abst. 82-83936E/40 Of EP61,151 (1982).

*Primary Examiner*—Arthur C. Prescott
*Attorney, Agent, or Firm*—George R. Dohmann

[57] ABSTRACT

The invention relates to a process for the dyeing of synthetic polyamide fibre materials, which comprises dyeing these fibre materials with a reactive dye of the formula $$HO_3S-Fa\text{-}(X-SO_2CH_2CH_2OSO_3H)_m \quad (1),$$

in which Fa is a dye radical, X is a direct bond or a radical of the formula $-CONHCH_2CH_2-$ and m is the number 1 or 2, the dye of the formula (1) containing only one sulfo group, from an aqueous liquor at a pH of 5 to 9 and, to set the dyeing temperature, raising the temperature from 80° C. to at least 95° C. over a period of at least 20 minutes. The process according to the invention produces level dyeings on synthetic polyamide fibre materials.

20 Claims, No Drawings

PROCESS FOR THE DYEING OF SYNTHETIC POLYAMIDE FIBRE MATERIALS

The present invention relates to a novel process for the dyeing of synthetic polyamide fibre materials with sulfo-containing reactive dyes.

Reactive dyes have been widely used for a long time for the dyeing of textiles made of fibre materials. In view of the increasing demands on reactive dyeings with respect to economy, application technology, fastness level and levelness, the state of the art is in many cases not yet fully satisfactory.

The present invention provides a process for the dyeing of synthetic polyamide fibre materials, which comprises dyeing these fibre materials with reactive dyes of the formula

$$HO_3S-Fa-(X-SO_2CH_2CH_2OSO_3H)_m \qquad (1),$$

in which Fa is a dye radical, X is a direct bond or a radical of the formula $-CONHCH_2CH_2-$ and m is the number 1 or 2, the dye of the formula (1) containing only one sulfo group, from an aqueous liquor at a pH of 5 to 9 and, to set the dyeing temperature, raising the temperature from 80° C. to at least 95° C. over a period of at least 20 minutes.

The process according to the invention produces level dyeings in the fibre and in the piece which are distinguished by a high fastness level and in particular by good exhaustion and fixation properties.

In the defined reactive dyes defined of the formula (1), the dye radical Fa is, for example, the radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye; preferably, Fa is the radical of a monoazo, polyazo or anthraquinone dye.

The radical Fa in formula (1) can contain customary organic dye substituents bonded to its basic structure.

Examples of further substituents in the radical Fa are: alkyl groups having 1 to 8, preferably 1 to 4, carbon atoms, such as methyl, ethyl, propyl, isopropyl or butyl, alkoxy groups having 1 to 8, preferably 1 to 4, carbon atoms, such as methoxy, ethoxy, propoxy, isopropoxy or butoxy, acylamino groups having 1 to 8 carbon atoms, in particular alkanoylamino groups and alkoxycarbonylamino groups having 2 to 4 carbon atoms, such as acetylamino, propionylamino, methoxycarbonylamino or ethoxycarbonylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluormethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, amino, ureido, hydroxyl, carboxyl, phenyl, naphthyl, phenylamino, N-alkylphenylamino having 1 to 8, preferably 1 to 4, carbon atoms in the alkyl radical, benzylamino, N-alkylbenzylamino having 1 to 8, preferably 1 to 4, carbon atoms in the alkyl radical, phenylaminosulfonyl, phenylaminosulfonyl substituted on the nitrogen atom by $C_1-C_8$alkyl, in particular $C_1-C_4$alkyl, phenylamino which is substituted in the phenyl ring by phenylaminosulfonyl or or by N-alkylphenylaminosulfonyl having 1 to 8, preferably 1 to 4, carbon atoms in the alkyl radical, it being possible for the phenyl or naphthyl rings of the abovementioned substituents to be further substituted by $C_1-C_4$alkyl, $C_1-C_4$alkoxy, $C_2-C_4$alkanoylamino, halogen or sulfo. If desired, two substituents of the ring systems mentioned together with the atoms linking them can form further fused-on ring systems.

The dyes of the formula (1) used in the process according to the invention are preferably reactive dyes of the formulae (2) to (8) as listed below:

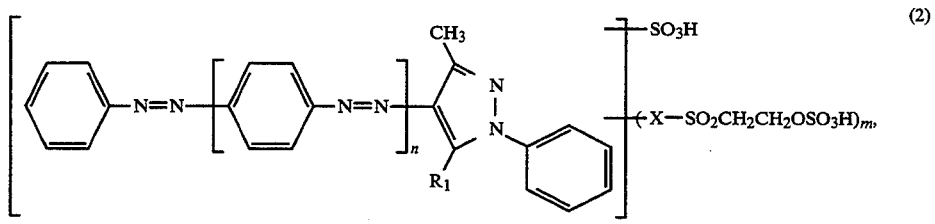

(2)

in which $R_1$ is hydrogen, $C_1-C_4$alkyl, amino or hydroxyl and n is the number 0 or 1,

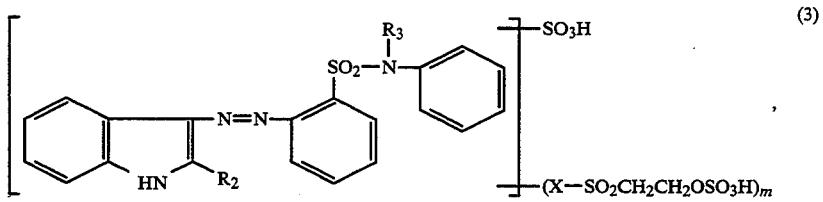

(3)

in which $R_2$ is hydrogen, $C_1-C_4$alkyl or phenyl which is unsubstituted or substituted by $C_1-C_4$alkyl, $C_1-C_4$alkoxy, $C_2-C_4$alkanoylamino or halogen, and $R_3$ is hydrogen or $C_1-C_4$alkyl,

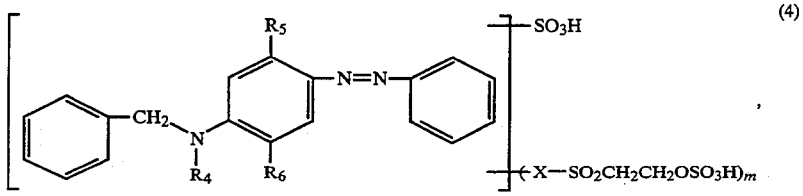

(4)

in which $R_4$ is hydrogen or $C_1$-$C_4$alkyl, $R_5$ and $R_6$ are hydrogen, $C_1$-$C_4$alkyl, $C_1$-$C_4$alkoxy $C_2$-$C_4$alkanoylamino or halogen, and $R_4$ and $R_6$, if desired together with the atoms linking them, form a tetrahydropyridine ring,

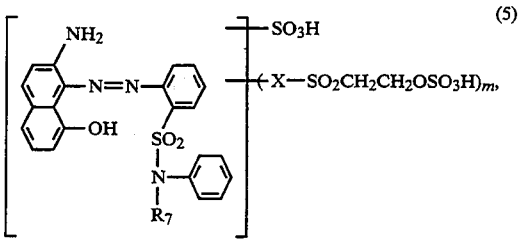

(5)

in which $R_7$ is hydrogen or $C_1$-$C_4$alkyl ist,

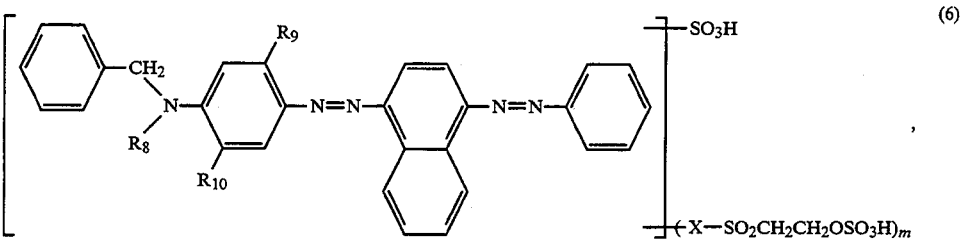

(6)

in which $R_8$ is hydrogen or $C_1$-$C_4$alkyl, $R_9$ and $R_{10}$ are hydrogen, $C_1$-$C_4$alkyl, $C_1$-$C_4$alkoxy, $C_2$-$C_4$alkanoylamino or halogen, and $R_8$ and $R_{10}$, if desired together with the atoms linking them, form a tetrahydropyridine ring,

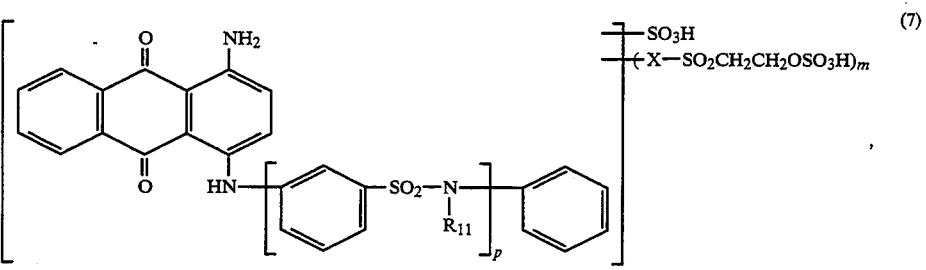

(7)

in which $R_{11}$ is hydrogen or $C_1$"$C_4$alkyl and p is the number 0 or 1, or X in the dyes of the formulae (2) to (8) being a direct bond or a radical of the formula —CONHCH$_2$CH$_2$— and m being the number 1 or 2, and the dyes of the formulae (2) to (8) being, if desired, further substituted by $C_1$-$C_4$alkyl, $C_1$-$C_4$alkoxy, $C_2$-$C_4$alkanoylamino or halogen, in particular methyl, methoxy, acetylamino or chlorine.

$R_1$, $R_2$, $R_3$, $R_4$, $R_5$, $R_6$, $R_7$, $R_8$, $R_9$, $R_{10}$, $R_{11}$ as $C_1$-$C_4$alkyl and as further substituent of the dyes of the formulae (2) to (8) are methyl, ethyl, propyl, isopropyl, butyl, isobutyl, sec-butyl or tert-butyl, in particular methyl.

$R_5$, $R_6$, $R_9$, $R_{10}$ as $C_1$-$C_4$alkoxy and as further substituent of the dyes of the formulae (2) to (8) are methoxy, ethoxy, propoxy, isopropoxy, butoxy, isobutoxy, sec-butoxy or tert-butoxy, in particular methoxy.

$R_5$, $R_6$, $R_9$, $R_{10}$ as $C_2$-$C_4$alkanoylamino and as further substituent of the dyes of the formulae (2) to (8) are, for example, acetylamino or propionylamino, in particular acetylamino.

$R_5$, $R_6$, $R_9$, $R_{10}$ as halogen and as further substituent of the dyes of the formulae (2) to (8) are, for example, fluorine, chlorine or bromine, in particular chlorine.

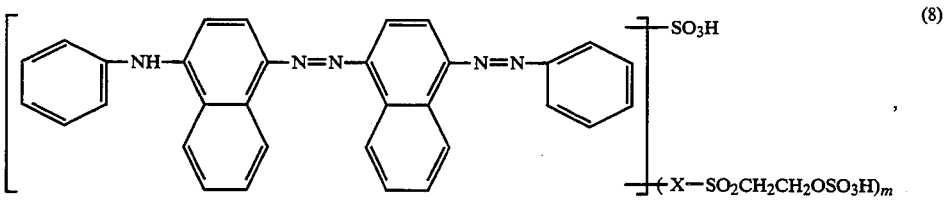

(8)

$R_2$ as phenyl is a phenyl radical which is unsubstituted or substituted by $C_1$-$C_4$alkyl, such as methyl, ethyl, propyl, isopropyl, butyl, isobutyl, sec-butyl or tert-butyl, $C_1$-$C_4$alkoxy, such as ethoxy, propoxy, isopropoxy, butoxy, isobutoxy, sec-butoxy or tert-butoxy, $C_2$-$C_4$alkanoylamino, for example acetylamino or propionylamino, or halogen, for example fluorine, chlorine or bromine.

The dyes of the formula (1) used in the process according to the invention are particularly preferably reactive dyes of the formula (1), in particular reactive dyes of the formulae (2) to (8) in which m is the number 1.

Very particularly preferred dyes for the process according to the invention are a) as reactive dyes of the formula (2), the dyes of the formulae

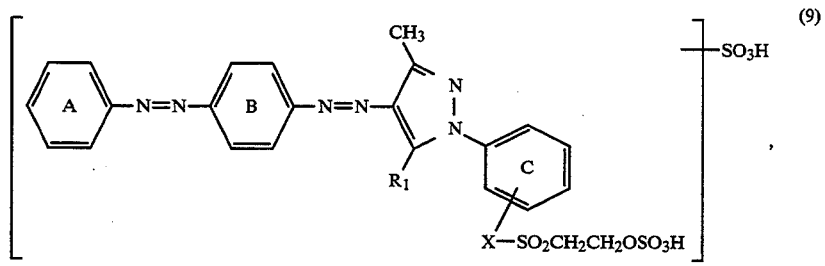

(9)

in which $R_1$ is hydrogen, $C_1$-$C_4$alkyl, amino or hydroxyl, in particular $C_1$-$C_4$alkyl, the benzene rings A, B and C are unsubstituted or substituted, independently of one another, by $C_1$-$C_4$alkyl, $C_1$-$C_4$alkoxy, $C_2$-$C_4$alkanoylamino or halogen, and X is a direct bond or a radical of the formula —CONHCH$_2$CH$_2$—, and in which the sulfo group is preferably bonded to benzene ring A, and

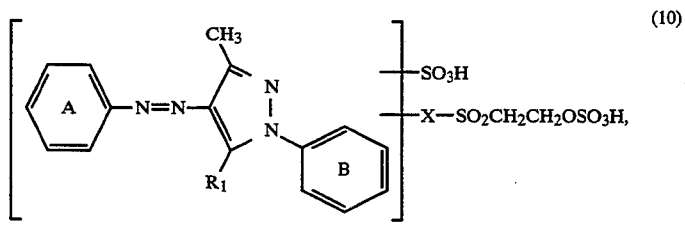

(10)

in which $R_1$ is amino or hydroxyl, benzene rings A and B are unsubstituted or substituted, independently of one another, by $C_1$-$C_4$alkyl, $C_1$-$C_4$alkoxy, $C_2$-$C_4$alkanoylamino or halogen, and X is a direct bond or a radical of the formula —CONHCH$_2$CH$_2$—;

b) as reactive dye of the formula (3), the dye of the formula

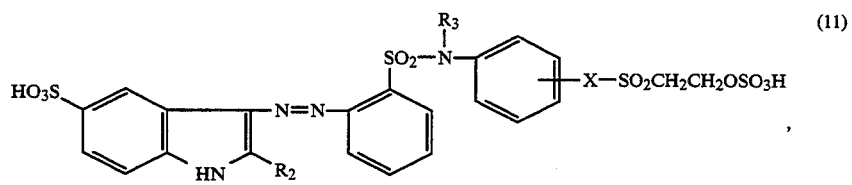

(11)

in which $R_2$ is $C_1$-$C_4$alkyl or phenyl, $R_3$ is hydrogen or $C_1$-$C_4$alkyl and X is a direct bond or a radical of the formula —CONHCH$_2$CH$_2$—;

c) as reactive dye of the formula (4), the dye of the formula

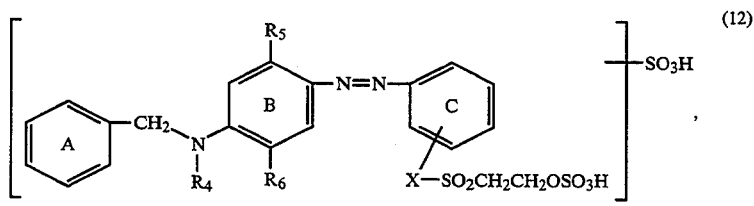

(12)

in which $R_4$ is hydrogen or $C_1$-$C_4$alkyl, $R_5$ is hydrogen, $C_1$-$C_4$alkyl, $C_1$-$C_4$alkoxy or $C_2$-$C_4$alkanoylamino, $R_6$ is hydrogen, $C_1$-$C_4$alkyl, $C_1$-$C_4$alkoxy or halogen, X is a direct bond or a radical of the formula —CONHCH$_2$CH$_2$—, benzene ring C is unsubstituted or substituted by $C_1$-$C_4$alkyl, $C_1$-$C_4$alkoxy or halogen, and the sulfo group is bonded to benzene ring A, B or C, in particular to benzene ring A;

d) as reactive dye of the formula (5), the dye of the formula

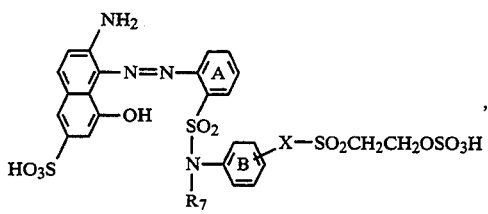

(13)

in which $R_7$ is hydrogen or $C_1$-$C_4$alkyl, X is a direct bond or a radical of the formula —CONHCH$_2$CH$_2$—, and benzene rings A and B are unsubstituted or substituted, independently of one another, by $C_1$-$C_4$alkyl, $C_1$-$C_4$alkoxy or halogen;

e) as reactive dye of the formula (6), the dye of the formula

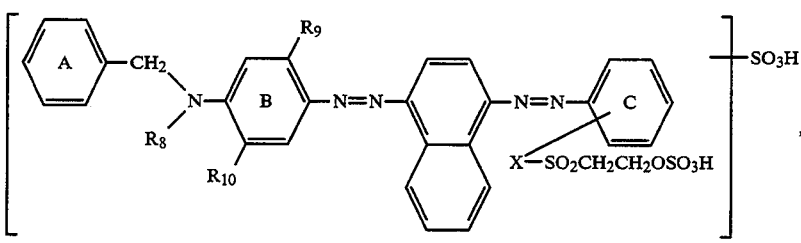

(14)

in which $R_8$ is hydrogen or $C_1$-$C_4$alkyl, $R_9$ is hydrogen, $C_1$-$C_4$alkyl, $C_1$-$C_4$alkoxy or $C_2$-$C_4$alkanoylamino, $R_{10}$ is hydrogen, $C_1$-$C_4$alkyl, $C_1$-$C_4$alkoxy or halogen, X is a direct bond or a radical of the formula —CONHCH$_2$CH$_2$— and benzene rings A, B and C are unsubstituted or substituted, independently of one another, by $C_1$-$C_4$alkyl, $C_1$-$C_4$alkoxy or halogen, and the sulfo group is bonded to benzene ring A, B or C, in particular to benzene ring A or C;

f) as reactive dye of the formula (7), the dye of the formula

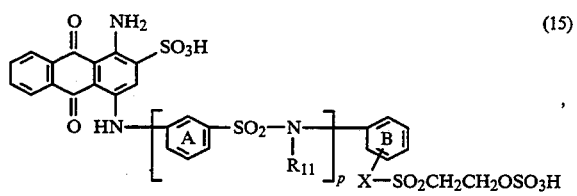

(15)

in which $R_{11}$ is hydrogen or $C_1$-$C_4$alkyl, p is the number 0 or 1, X is a direct bond or a radical of the formula —CONHCH$_2$CH$_2$—, and benzene rings A and B are unsubstituted or substituted, independently of one another, by $C_1$-$C_4$alkyl, $C_1$-$C_4$alkoxy or halogen, and g) as reactive dye of the formula (8), the dye of the formula

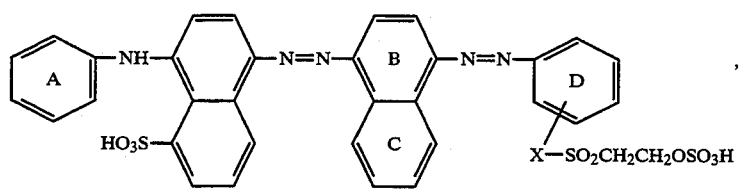

(16)

in which X is a direct bond or a radical of the formula —CONHCH$_2$CH$_2$—, and benzene rings A, B, C and D, in particular only benzene rings A and D, are unsubstituted or substituted, independently of one another, by $C_1$-$C_4$alkyl, $C_1$-$C_4$alkoxy or halogen.

The dye liquors can contain, apart from water and the dyes, further additives, for example wetting agents, antifoams, levelling agents, or agents affecting the property of the textile material, for example softening agents, additives for flameproof finish or soil-, water- or oil-repellent agents, and water-softening agents.

The liquor ratio can be selected within a wide range, for example from 5:1 to 80:1, preferably from 10:1 to 50:1.

The amounts in which the reactive dyes defined of the formula (1) are used in the dye baths can vary, depending on the desired colour depth, within wide limits, the amounts which have proved to be advantageous being in general 0.01 to 10% by weight, relative to the material to be dyed.

Dyeing is carded out from an aqueous liquor, for example by the exhaust method, for example at temperatures of 95° to 130° C., in particular 95° to 110° C., preferably 95° to 102° C.

In a preferred embodiment of the process according to the invention, the dyeing temperature is adjusted by increasing the temperature of 80° C. to a temperature of 95° to 110° C., in particular 95° to 102° C., over a period of at least 20 minutes. The increase in temperature mentioned is preferably carried out over a period of at least 30 minutes. The upper limit of the period of increasing the temperature is, for example, 3 hours, in particular 1 hour, and preferably 45 minutes.

It is advantageous for the process according to the invention to maintain, as far as possible, a constant pH during dyeing.

In order to keep the pH constant, dyeing is carried out, for example, in the presence of a buffer or the amount of a base, for example sodium hydroxide or potassium hydroxide necessary for keeping the pH constant is metered in during dyeing. Buffers which can be used are the customary buffer systems, for example disodium carbonate/sodium hydroxide, sodium bicarbonate/sodium hydroxide, disodium hydrogen phosphate/sodium hydroxide or sodium dihydrogen phosphate/sodium hydroxide. Metered addition of a base can take place, for example, by continuous determination of the pH during dyeing and addition of the amount of a base necessary for keeping the pH constant via suitable metering systems.

Preferably, dyeing is carried out at a pH of 5.5 to 8, in particular 6 to 7.

The process according to the invention is suitable in particular for dyeing by the exhaust method.

In order to complete fixation or exhaustion onto the fibre, it is possible, if desired, to lower the pH following the dyeing process, for example to a value of 3 to 5.

In a very particularly preferred embodiment of the process according to the invention, dyeing is carried out by the exhaust method at a temperature of 95° to 110° C., in particular 95° to 102° C., dyeing is carried out in the presence of a buffer, or the amount of a base necessary for keeping the pH constant is metered in during dyeing, and, in order to adjust the dyeing temperature, the temperature of 80° C. is increased to a temperature of 95° to 110° C., in particular 95° to 102° C., over a period of at least 20 minutes, in particular at least 30 minutes.

The synthetic polyamide fibre material which can be dyed according to the invention is any known synthetic polyamide suitable for this purpose, for example nylon 6 or nylon 6.6. This fibre material can be present in a wide range of processing forms, for example as fibre, yarn, woven or knitted fabric or in the form of carpets.

The reactive dyes used in the process according to the invention are partly known or can be prepared analogously to known compounds. The still novel reactive dyes of the formulae (2) to (8) are also provided by the invention.

Accordingly, the present invention furthermore provides reactive dyes of the formula

$HO_3S-Fa'-X-SO_2CH_2CH_2OSO_3H$ (17), in which X is a direct bond or a radical of the formula $-CONHCH_2CH_2-$ and Fa' is a radical of the formula

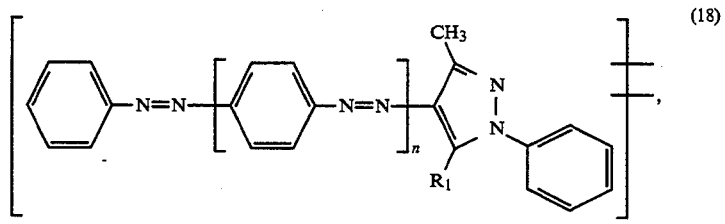

(18)

in which $R_1$ is hydrogen, $C_1-C_4$alkyl, amino or hydroxyl and n is the number 0 or 1, X being a radical of the formula $-CONHCH_2CH_2-$ in the case where n is the number 0, or

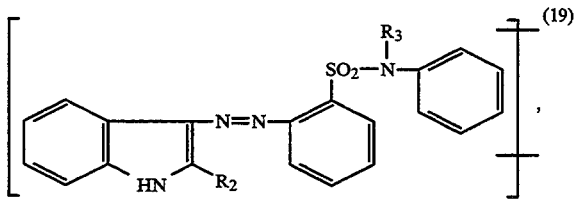

(19)

in which $R_2$ is hydrogen $C_1-C_4$alkyl or phenyl which is unsubstituted or substituted by $C_1-C_4$alkyl, $C_1-C_4$alkoxy, $C_2-C_4$alkanoylamino or halogen, and $R_3$ is hydrogen or $C_1-C_4$alkyl, or

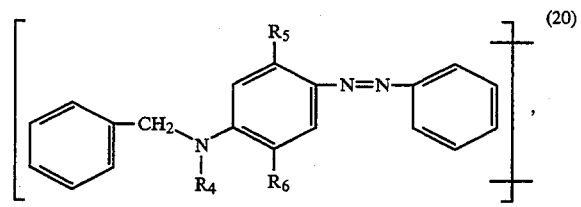

(20)

in which $R_4$ is hydrogen or $C_1-C_4$alkyl, $R_8$ and $R_6$ are hydrogen, $C_1-C_4$alkyl, $C_1-C_4$alkoxy, $C_2-C_4$alkanoylamino or halogen and $R_4$ and $R_6$, if desired together with the atoms linking them, form a tetrahydropyridine ring, or

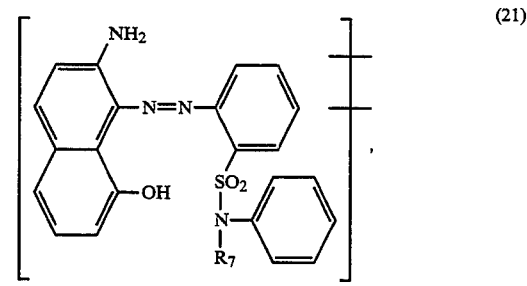

(21)

in which $R_7$ is hydrogen or $C_1-C_4$alkyl, or

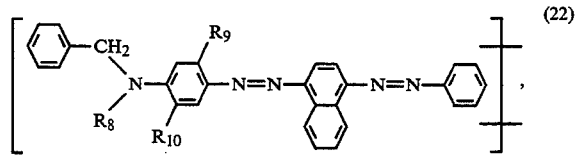

(22)

in which $R_8$ is hydrogen or $C_1-C_4$alkyl, $R_9$ and $R_{10}$ are hydrogen, $C_1-C_4$alkyl, $C_1-C_4$alkoxy, $C_2-C_4$alkanoylamino or halogen and $R_8$ and $R_{10}$, if desired together with the atoms linking them, form a tetrahydropyridine ring, or

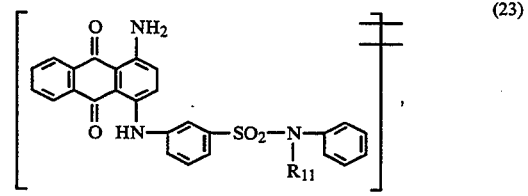

(23)

in which $R_{11}$ is hydrogen or $C_1-C_4$alkyl, or

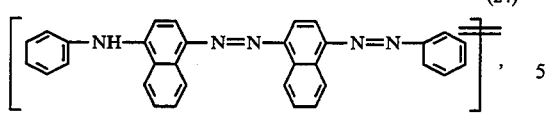

the radicals Fa' of the formulae (18) to (24) being each unsubstituted or substituted, independently of one another, by $C_1$-$C_4$alkyl, $C_1$-$C_4$alkoxy, $C_2$-$C_4$alkanoylamino or halogen, or reactive dyes of the formula

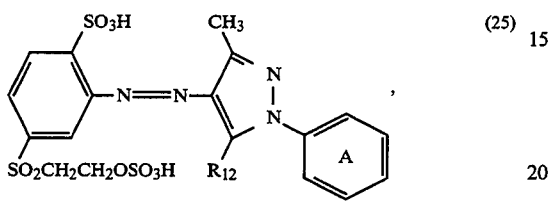

in which $R_{12}$ is amino or hydroxyl and benzene ring A is unsubstituted or substituted by $C_1$-$C_4$alkyl, $C_1$-$C_4$alkoxy, $C_2$-$C_4$alkanoylamino or halogen.

As for $R_1$, $R_2$, $R_3$, $R_4$, $R_5$, $R_6$, $R_7$, $R_8$, $R_9$, $R_{10}$, $R_{11}$ as $C_1$-$C_4$alkyl and as further substituent of the compounds of the formulae (18) to (25) and as for $R_5$, $R_6$, $R_9$, $R_{10}$ as $C_1$-$C_4$alkoxy, $C_2$-$C_4$alkanoylamino and halogen and as further substituent of the compounds of the formulae (18) to (25) the meanings and preferences given under formulae (2) to (8) apply.

$R_2$ as phenyl is a phenyl radical which is unsubstituted or substituted by $C_1$-$C_4$alkyl, such as methyl, ethyl, propyl, isopropyl, butyl, isobutyl, sec-butyl or tert-butyl, $C_1$-$C_4$alkoxy, such as ethoxy, propoxy, isopropoxy, butoxy, isobutoxy, sec-butoxy or tert-butoxy, $C_2$-$C_4$alkanoylamino, such as acetylamino or propionylamino, or halogen, such as fluorine, chlorine or bromine.

Preferred reactive dyes of the formula (17) are a) dyes of the formula (9) in which $R_1$ is $C_1$-$C_4$alkyl, amino or hydroxyl, in particular $C_1$-$C_4$alkyl, benzene rings A, B and C are unsubstituted or substituted, independently of one another, by $C_1$-$C_4$alkyl, $C_1$-$C_4$alkoxy, $C_2$-$C_4$alkanoylamino or halogen and X is a direct bond or a radical of the formula —CONHCH$_2$CH$_2$—, preferably those in which the sulfo group is bonded to benzene ring A and benzene rings A, B and C do not contain any further substituents;

b) dyes of the formula (10) in which $R_1$ is amino or hydroxyl, X is a radical of the formula —CONHCH$_2$CH$_2$—, and benzene rings A and B are unsubstituted or substituted, independently of one another, by $C_1$-$C_4$alkyl, $C_1$-$C_4$alkoxy, $C_2$-$C_4$alkanoylamino or halogen, preferably those in which benzene rings A and B, independently of one another, are unsubstituted or substituted by halogen;

c) dyes of the formula (11), in which $R_2$ is $C_1$-$C_4$alkyl or phenyl, $R_3$ is hydrogen or $C_1$-$C_4$alkyl and X is a direct bond or a radical of the formula —CONHCH$_2$CH$_2$—;

d) dyes of the formula (12), in which $R_4$ is hydrogen or $C_1$-$C_4$alkyl, $R_5$ is hydrogen, $C_1$-$C_4$alkyl, $C_1$-$C_4$alkoxy or $C_2$-$C_4$alkanoylamino, $R_6$ is hydrogen, $C_1$-$C_4$alkyl, $C_1$-$C_4$alkoxy or halogen, X is a direct bond or a radical of the formula —CONHCH$_2$CH$_2$—, benzene ring C is unsubstituted or substituted by $C_1$-$C_4$alkyl, $C_1$-$C_4$alkoxy or halogen, and the sulfo group is bonded to benzene ring A, B or C, preferably those in which $R_6$ is hydrogen, X is a radical of the formula —CONHCH$_2$CH$_2$—, the sulfo group is bonded to benzene ring A, and benzene rings A, B and C do not contain any further substituents;

e) dyes of the formula (13) in which $R_7$ is hydrogen or $C_1$-$C_4$alkyl, X is a direct bond or a radical of the formula —CONHCH$_2$CH$_2$—, and benzene rings A and B, independently of one another, are unsubstituted or substituted by $C_1$-$C_4$alkyl, $C_1$-$C_4$alkoxy or halogen, preferably those in which benzene rings A and B do not contain any further substituents;

f) dyes of the formula (14), in which $R_8$ is hydrogen or $C_1$-$C_4$alkyl, $R_9$ is hydrogen, $C_1$-$C_4$alkyl, $C_1$-$C_4$alkoxy or $C_2$-$C_4$alkanoylamino, $R_{10}$ is hydrogen, $C_1$-$C_4$alkyl, $C_1$-$C_4$alkoxy or halogen, X is a direct bond or a radical of the formula —CONHCH$_2$CH$_2$—, and benzene rings A, B and C, independently of one another, are unsubstituted or substituted by $C_1$-$C_4$alkyl, $C_1$-$C_4$alkoxy or halogen, and the sulfo group is bonded to benzene ring A, B or C, preferably those in which $R_{10}$ is hydrogen, the sulfo group is bonded to benzene ring A or C, and benzene rings A and C do not contain any further substituents;

g) dyes of the formula

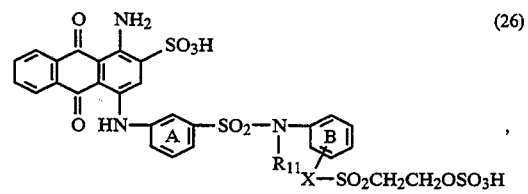

in which $R_{11}$ is hydrogen or $C_1$-$C_4$alkyl, X is a direct bond or a radical of the formula —CONHCH$_2$CH$_2$—, and benzene rings A and B, independently of one another, are unsubstituted or substituted by $C_1$-$C_4$alkyl, $C_1$-$C_4$alkoxy or halogen, preferably those in which benzene rings A and B do not contain any further substituents;

h) dyes of the formula (16) in which X is a direct bond or a radical of the formula —CONHCH$_2$CH$_2$—, and benzene rings A, B, C and D, in particular only benzene rings A and D, independently of one another, are unsubstituted or substituted by $C_1$-$C_4$alkyl, $C_1$-$C_4$alkoxy or halogen;

i) dyes of the formula (25) in which $R_{12}$ is amino or hydroxyl and benzene ring A is unsubstituted or substituted by methyl, methoxy or chlorine.

The novel reactive dyes of the formula (17) in which Fa' is a radical of the formula (18) are prepared by diazotising an amine of the formula

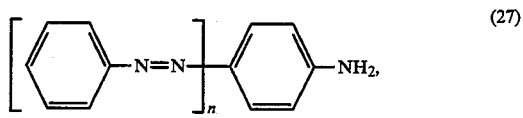

in which n is the number 0 or 1, and coupling the resulting diazonium salt onto a coupling component of the formula

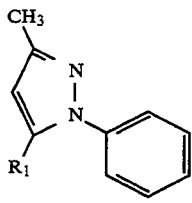   (28)

in which $R_1$ is amino or hydroxyl, or diazotising an amine of the formula (27) and coupling the resulting diazonium salt onto a coupling component of the formula

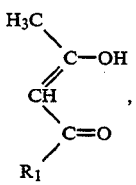   (29)

in which $R_1$ is hydrogen or $C_1$-$C_4$alkyl, and reacting the reaction product with a hydrazine of the formula

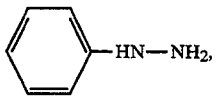   (30)

the amine of the formula (27), the coupling components of the formulae (28) and (29) and the hydrazine of the formula (30) being unsubstituted or substituted by $C_1$-$C_4$alkyl, $C_1$-$C_4$alkoxy, $C_2$-$C_4$alkanoylamino, halogen, sulfo or a radical of the formula —X—$SO_2CH_2CH_2OSO_3H$, in which X is a direct bond or —$CONHCH_2CH_2$—, and the amine of the formula (27) and the coupling component of the formula (28) or the amine of the formula (27) and the coupling component of the formula (29) and the hydrazine of the formula (30) together containing only one sulfo group and together containing only one radical of the formula —X—$SO_2CH_2CH_2OSO_3H$, X being a radical of the formula —$CONHCH_2CH_2$— in the case where n is the number 0.

The novel reactive dyes of the formula (17) in which Fa' is a radical of the formula (19) or (21) are prepared by diazotising an amine of the formula

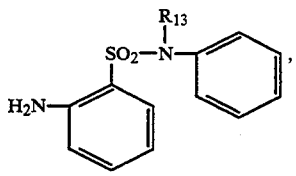   (31)

in which $R_{13}$ is hydrogen or $C_1$-$C_4$alkyl, and coupling the resulting diazonium salt onto a coupling component of the formula

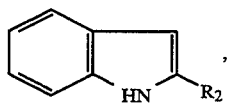   (32)

in which $R_2$ is hydrogen, $C_1$-$C_4$alkyl or phenyl which is unsubstituted or substituted by $C_1$-$C_4$alkyl, $C_1$-$C_4$alkoxy, $C_2$-$C_4$alkanoylamino or halogen, or onto a coupling component of the formula

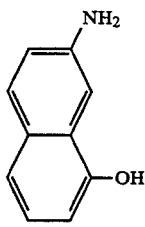   (33)

the amine of the formula (31) and the coupling components of the formulae (32) and (33) being unsubstituted or substituted by $C_1$-$C_4$alkyl, $C_1$-$C_4$alkoxy, $C_2$-$C_4$alkanoylamino, halogen, sulfo or the radical of the formula —X—$SO_2CH_2CH_2OSO_3H$, in which X is a direct bond or —$CONHCH_2CH_2$— and the amine of the formula (31) and the coupling component of the formula (32) or the amine of the formula (31) and the coupling component of the formula (33) together containing only one sulfo group and together containing only one radical of the formula —X—$SO_2CH_2CH_2OSO_3H$.

Novel reactive dyes of the formula (17) in which Fa' is a radical of the formula (20) are prepared by diazotising an amine of the formula

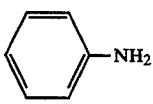   (34)

and coupling the resulting diazonium salt onto a coupling component of the formula

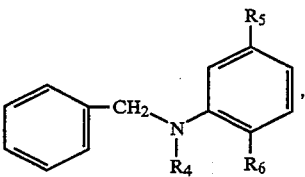   (35)

in which $R_4$ is hydrogen or $C_1$-$C_4$alkyl, $R_5$ and $R_6$ are hydrogen, $C_1$-$C_4$alkyl, $C_1$-$C_4$alkoxy, $C_2$-$C_4$alkanoylamino or halogen, and $R_4$ and $R_6$, if desired together with the atoms linking them, form a tetrahydropyridine ring, the amine of the formula (34) and the coupling component of the formula (35) being unsubstituted or substituted by $C_1$-$C_4$alkyl, $C_1$-$C_4$alkoxy, $C_2$-$C_4$alkanoylamino, halogen, sulfo or a radical of the formula —X—$SO_2CH_2CH_2OSO_3H$, in which X is a direct bond or —$CONHCH_2CH_2$—, and the amine of the formula (34) and the coupling component of the formula (35) together containing only one sulfo and together containing only one radical of the formula —X—$SO_2CH_2CH_2OSO_3H$.

Novel reactive dyes of the formula (17) in which Fa' is a radical of the formula (22) or (24) are prepared by diazotising an amine of the formula

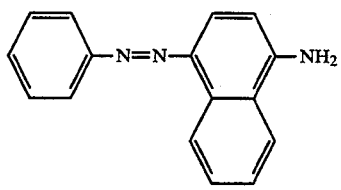 (36)

and coupling the resulting diazonium salt onto a coupling component of the formula

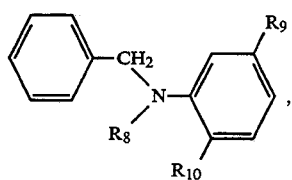 (37)

in which $R_8$ is hydrogen or $C_1$–$C_4$alkyl, $R_9$ and $R_{10}$ are hydrogen, $C_1$–$C_4$alkyl, $C_1$–$C_4$alkoxy, $C_2$–$C_4$alkanoylamino or halogen, and $R_8$ and $R_{10}$, if desired together with the atoms linking them, form a tetrahydropyridine ring, or onto a coupling component of the formula

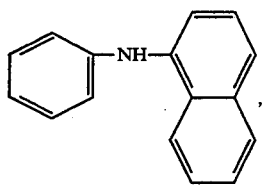 (38)

the amine of the formula (36) and the coupling components of the formulae (37) and (38) being unsubstituted or substituted by $C_1$–$C_4$alkyl, $C_1$–$C_4$alkoxy, $C_2$–$C_4$alkanoylamino, halogen, sulfo or a radical of the formula —X—$SO_2CH_2CH_2OSO_3H$, in which X is a direct bond or —$CONHCH_2CH_2$—, and the amine of the formula (36) and the coupling component of the formula (37) or the amine of the formula (36) and the coupling component of the formula (38) together containing only one sulfo group and together containing only one radical of the formula —X—$SO_2CH_2CH_2OSO_3H$.

The novel reactive dyes of the formula (17) in which Fa' is a radical of the formula (23) are prepared by reacting a compound of the formula

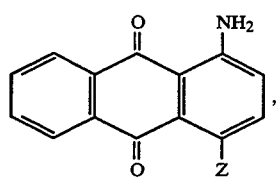 (39)

in which Z is an anionic leaving group, with a compound of the formula,

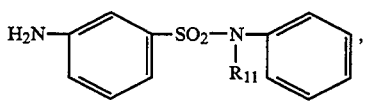 (40)

in which $R_{11}$ is hydrogen or $C_1$–$C_4$alkyl, the compounds of the formulae (39) and (40) being unsubstituted or substituted by $C_1$–$C_4$alkyl, $C_1$–$C_4$alkoxy, $C_2$–$C_4$alkanoylamino, halogen, sulfo or a radical of the formula —X—$SO_2CH_2CH_2OSO_3H$, in which X is a direct bond or —$CONHCH_2CH_2$—, and the compounds of the formulae (39) and (40) together containing only one sulfo group and together containing only one radical of the formula —X—$SO_2CH_2CH_2OSO_3H$.

The novel reactive dyes of the formula (17) in which Fa' is a radical of the formula (25) are prepared by diazotising an amine of the formula

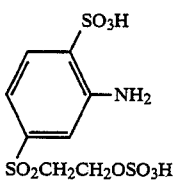 (41)

and coupling the resulting diazonium salt onto a coupling component of the formula

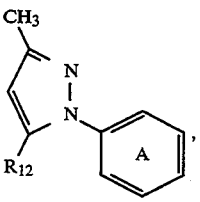 (42)

in which $R_{12}$ is amino or hydroxyl and phenyl ring A is unsubstituted or substituted by $C_1$–$C_4$alkyl, $C_1$–$C_4$alkoxy, $C_2$–$C_4$alkanoylamino or halogen.

As for the substituents of the compounds of the formulae (27) to (42) used for preparing the reactive dyes of the formula (17), the preferences given for the reactive dyes of the formula (17) also apply.

The anionic leaving group Z in the compound of the formula (39) is, for example, halogen, in particular bromine.

The amines of the formulae (27), (31), (34), (36) and (41), the coupling components of the formulae (28), (29), (32), (33), (35), (37), (38) and (42) and the compounds of the formulae (30), (39) and (40) are known per se or can be prepared analogously to known compounds.

As a rule, diazotisation of the amines of the formulae (27), (31), (34), (36) and (41) by reacting them with nitrous acid in aqueous mineral acid solution at low temperature, and coupling of the resulting diazonium salts onto the coupling components of the formulae (28), (29), (32), (33), (35), (37), (38) and (42) takes place at acidic, neutral to weakly alkaline pH values.

Reaction of the compound of the formula (39) with the compound of the formula (40) takes place, for example, in aqueous solution or a mixture of water and an organic solvent, for example water/ethanol, with the addition of acid-binding agents, for example alkali metal hydroxides, alkali metal carbonates or alkali metal bicarbonates, at temperatures of, for example, 50° to 100° C., preferably in the presence of a mixture of copper chloride and copper.

Reaction with a hydrazine of the formula (30) takes place in water, an organic solvent, for example methanol, ethanol, pyridine or glacial acetic acid, or a mixture of water and an organic solvent, for example water/glacial acetic acid, at a temperature of, for example, 40° to 100° C.

Furthermore, disazo dyes of the formula (17) in which Fa' is a radical of the formula (22) can be obtained by diazotisation of aniline, coupling of the resulting diazonium salt onto 1-aminonaphthalene, diazotisation of the reaction product obtained and coupling of the resulting diazonium salt onto a coupling component of the formula (37), the aniline, 1-aminonaphthalene and the coupling component of the formula (37) being unsubstituted or substituted by $C_1$–$C_4$alkyl, $C_1$–$C_4$alkoxy, $C_2$–$C_4$alkanoylamino, halogen, sulfo or a radical of the formula —X—$SO_2CH_2CH_2OSO_3H$, in which X is a direct bond or a radical of the formula —$CONHCH_2CH_2$—, and the aniline, 1-aminonaphthalene and the coupling component of the formula (37) together containing only one sulfo group and together containing only one radical of the formula —X—$SO_2CH_2CH_2OSO_3H$.

Furthermore, disazo dyes of the formula (17) in which Fa' is a radical of the formula (24) can be obtained by diazotisation of aniline, coupling of the resulting diazonium salt onto 1-aminonaphthalene, diazotisation of the reaction product obtained and coupling of the resulting diazonium salt onto 1-phenylaminonaphthalene, the aniline, 1-aminonaphthalene and the 1-phenylaminonaphthalene being unsubstituted or substituted by $C_1$–$C_4$alkyl, $C_1$–$C_4$alkoxy, $C_2$–$C_4$alkanoylamino, halogen, sulfo or a radical of the formula —X—$SO_2CH_2CH_2OSO_3H$, in which X is a direct bond or a radical of the formula —$CONHCH_2CH_2$—, and the aniline, 1-aminonaphthalene and 1-phenylaminonaphthalene together containing only one sulfo group and together containing only one radical of the formula —X—$SO_2CH_2CH_2OSO_3H$.

A modified embodiment of the process for the preparation of the rective dyes of the formula (17) consists in starting with a precursor of the dye, for example a diazo or coupling component which contains a radical of the formula —X—$SO_2CH_2CH_2OH$, in which X is a direct bond or —$CONHCH_2CH_2$—. After the dye or a precursor of the dye has been prepared, the radical of the formula —X—$SO_2CH_2CH_2OH$ is then reacted with concentrated sulfuric acid or oleum, as a result of which the hydroxyl group is convened to the sulfato group.

The dyes according to the invention of the formula (17) and the dyes used for dyeing in the process according to the invention are either present in the form of the free sulfonic acid or, preferably, as salts thereof.

Examples of suitable salts are alkali metal salts, alkaline earth metal salts or ammonium salts, or salts of an organic amine. Examples are the sodium salts, lithium salts, potassium salts or ammonium salts or the salt of mono-, di- or triethanolamine.

The dyes according to the invention of the formula (17) are suitable for the customary dyeing and printing methods. The dye liquors or printing pastes can contain, apart from water and the dyes, further additives, for example wetting agents, antifoams, levelling agents, or agents influencing the property of the textile material, for example softening agents, additives for flameproof finish or soil-, water- and oil-repellent agents, and water-softening agents and natural or synthetic thickeners, for example alginates and cellulose ethers. The dyes according to the invention of the formula (17) are suitable in particular for the process of the present invention for the dyeing of synthetic polyamide fibre materials.

The dyes according to the invention of the formula (17) are distinguished by uniform colour build-up, good exhaustion onto the fibre and good fixation properties and good general fastness properties, such as rub, wet, wet rub and light fastness.

The dyes according to the invention of the formula (17) are suitable for the dyeing or printing not only of natural polyamide fibre materials, for example wool, but also in particular of synthetic polyamide fibre materials, for example nylon 6 or nylon 6.6, and are also suitable for the dyeing or printing of blend fabrics or blend yarns based on wool or synthetic polyamide fibre materials.

The fibre material mentioned can be present in a wide range of, usually textile, processing forms, for example as fibre, yarn, woven or knitted fabric or in the form of carpet.

In the examples which follow, parts are by weight. Temperatures are given in degrees centigrade. Parts by weight relate to parts by volume as the gram relates to the cubic centimeter.

EXAMPLE 1

35 parts of 3-amino-N-(2-sulfatoethylsulfonylethyl)-benzamide are dissolved in 200 parts of water together with 25 parts of 32% hydrochloric acid and diazotised at a temperature of 0° to 5° C. with 25 parts of a 4-normal sodium nitrite solution. After diazotisation is complete, the reaction mixture obtained is slowly added dropwise at a temperature of 0° to 5° C. to a solution of 26 parts of 1-(4'-sulfophenyl)-3-methyl-5-pyrazolone in 200 parts of water, during which the pH is maintained at 5 to 6 by addition of an aqueous 20% sodium carbonate solution. After coupling has been carried out, the reaction mixture is neutralised with sodium carbonate, and the reaction product is salted out by addition of sodium chloride. Filtration and drying give the dye of the formula

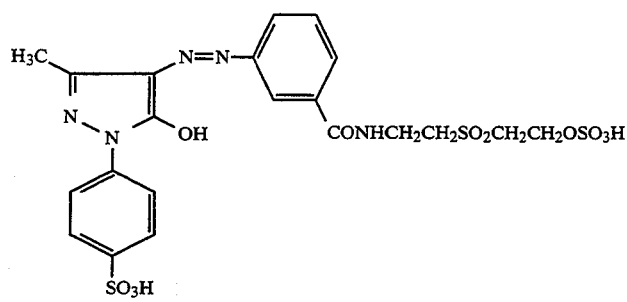

(101)

in the form of the free acid. The dye of the formula (101) dyes natural and synthetic polyamide fibre material in yellow hues.

EXAMPLES 2 TO 8

Example 1 is repeated, except that an equimolar amount of one of the coupling components listed in Table 1 in column 2 is used instead of 26 parts of 1-(4'-sulfophenyl)-3-methyl-5-pyrazolone and an equimolar amount of one of the amines listed in Table 1 in column 3 is used instead of 35 parts of 3-amino-N-(2-sulfatoethylsulfonylethyl)benzamide, giving analogous dyes which dye natural and synthetic polyamide fibre material in yellow hues.

TABLE 1

| Example | Coupling component | Amine |
|---|---|---|
| 2 | [pyrazolone with H3C, N-N, OH, phenyl-SO3H] | H2N—C6H4—CONHCH2CH2SO2CH2CH2OSO3H |
| 3 | [pyrazolone with H3C, N-N, NH2, Cl-phenyl-SO3H] | H2N—C6H4—CONHCH2CH2SO2CH2CH2OSO3H |
| 4 | [pyrazolone with H3C, N-N, NH2, Cl-phenyl-SO3H] | H2N—C6H4—CONHCH2CH2SO2CH2CH2OSO3H (meta) |
| 5 | [pyrazolone with H3C, N-N, OH, phenyl-SO3H] | Cl, H3N—C6H3—CONHCH2CH2SO2CH2CH2OSO3H |

TABLE 1-continued

| Example | Coupling component | Amine |
|---|---|---|
| 6 | 3-methyl-1-(4-sulfophenyl)-5-amino-pyrazole | 4-chloro-3-amino-N-(sulfatoethylsulfonylethyl)benzamide (H$_2$N on ring, Cl ortho; CONHCH$_2$CH$_2$SO$_2$CH$_2$CH$_2$OSO$_3$H) |
| 7 | 3-methyl-1-(2-chloro-6-methylphenyl)-5-hydroxy-pyrazole | 2-amino-4-(β-sulfatoethylsulfonyl)-benzenesulfonic acid (HO$_3$S, H$_2$N, SO$_2$CH$_2$CH$_2$OSO$_3$H) |
| 8 | 3-methyl-1-phenyl-5-amino-pyrazole | 2-amino-4-(β-sulfatoethylsulfonyl)-benzenesulfonic acid (HO$_3$S, H$_2$N, SO$_2$CH$_2$CH$_2$OSO$_3$H) |

EXAMPLES 9 TO 17

Example 1 is repeated, except that an equimolar amount of one of the coupling components listed in Table 2 in column 2 is used instead of 26 parts of 1-(4'-sulfophenyl)-3-methyl-5-pyrazolone and an equimolar amount of one of the amines listed in Table 2 in column 3 is used instead of 35 parts of 3-amino-N-(2-sulfatoethylsulfonylethyl)benzamide, giving analogous dyes which dye natural and synthetic polyamide fibre material in orange hues.

TABLE 2

| Example | Coupling component | Amine |
|---|---|---|
| 9 | 3-sulfo-benzyl-N-ethyl-N-phenylamine | 3-amino-N-(2-sulfatoethylsulfonylethyl)benzamide (H$_2$N–C$_6$H$_4$–CONHCH$_2$CH$_2$SO$_2$CH$_2$CH$_2$OSO$_3$H) |
| 10 | 3-sulfo-benzyl-N-ethyl-N-(3-methylphenyl)amine | 3-amino-N-(2-sulfatoethylsulfonylethyl)benzamide |
| 11 | 3-sulfo-benzyl-N-ethyl-N-(3-acetylaminophenyl)amine | 3-amino-N-(2-sulfatoethylsulfonylethyl)benzamide |

TABLE 2-continued

| Example | Coupling component | Amine |
|---|---|---|
| 12 | 3-(N-ethyl-N-phenylaminomethyl)benzenesulfonic acid | $H_2N-C_6H_4-CONHCH_2CH_2SO_2CH_2CH_2OSO_3H$ |
| 13 | 3-[N-ethyl-N-(3-methylphenyl)aminomethyl]benzenesulfonic acid | $H_2N-C_6H_4-CONHCH_2CH_2SO_2CH_2CH_2OSO_3H$ |
| 14 | 3-[N-ethyl-N-(3-acetamidophenyl)aminomethyl]benzenesulfonic acid | $H_2N-C_6H_4-CONHCH_2CH_2SO_2CH_2CH_2OSO_3H$ |
| 15 | 3-(N-ethyl-N-phenylaminomethyl)benzenesulfonic acid | 4-chloro-3-amino-$C_6H_3$-$CONHCH_2CH_2SO_2CH_2CH_2OSO_3H$ |
| 16 | 3-[N-ethyl-N-(3-methylphenyl)aminomethyl]benzenesulfonic acid | 4-chloro-3-amino-$C_6H_3$-$CONHCH_2CH_2SO_2CH_2CH_2OSO_3H$ |
| 17 | 3-[N-ethyl-N-(3-acetamidophenyl)aminomethyl]benzenesulfonic acid | 4-chloro-3-amino-$C_6H_3$-$CONHCH_2CH_2SO_2CH_2CH_2OSO_3H$ |

EXAMPLE 18

32 parts of 3-amino-N-(2-sulfatoethylsulfonylethyl)-benzamide are dissolved in 200 parts of water together with 25 parts of 32% hydrochloric acid and diazotised at a temperature of 0° to 5° with 25 parts of a 4-normal sodium nitrite solution. After diazotisation is complete, the reaction mixture obtained is slowly added dropwise at a temperature of 0° to 5° to a solution of 14.3 parts of 1-aminonaphthalene and 12 parts of 32% hydrochloric acid in 200 parts of water. After stirring for 3 hours, 10 parts of an aqueous 20% sodium carbonate solution are added dropwise to the reaction mixture over a period of two hours. After coupling is complete, 300 parts of ice and 30 parts of 32% hydrochloric acid are added, and the reaction mixture is diazotised by addition of 25 parts of a 4-normal sodium nitrite solution. After diazotisation is complete, 30 parts of N-ethyl-N-(3-sulfobenzyl-)aniline are added, during which the pH is maintained at a value of about 4 by addition of 40 parts of sodium acetate. After coupling has been carried out, the reaction mixture is neutralised with sodium carbonate, and the reaction product is salted out by addition of sodium chloride. Filtration and drying give the dye of the formula

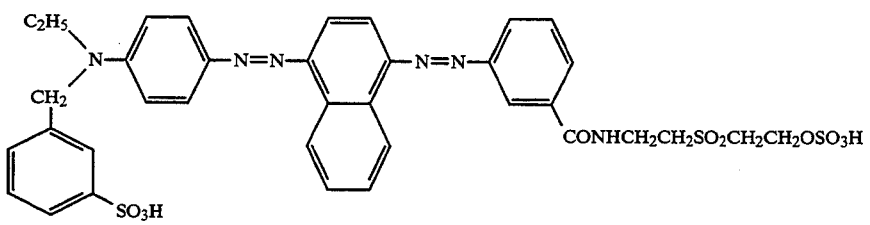

(102)

in the form of the free acid. The dye of the formula (102) dyes natural and synthetic polyamide fibre material in ruby red hues.

EXAMPLES 19 TO 29

Example 18 is repeated, except that, where appropriate, an equimolar amount of 4-amino-N-(2-sulfatoethylsulfonylethyl)benzamide or 3- or 4-(2-sulfatoethylsulfonyl)aniline is used instead of 32 parts of 3-amino-N-(2-sulfatoethylsulfonylethyl)benzamide and, where appropriate, an equimolar amount of N-ethyl-N-(3-sulfobenzyl)3-methylaniline or N-ethyl-N-(3-benzyl)-3-acetylaminoaniline is used instead of 30 parts of N-ethyl-N-(3-sulfobenzyl)aniline, giving the dyes listed in Table 3 in the form of the free acid, which dye natural and synthetic polyamide fibre material in ruby red hues.

TABLE 3

| Example | Dye |
|---|---|
| 19 | (structure with C2H5, CH2-phenyl-SO3H, N-phenyl-N=N-naphthalene-N=N-phenyl-CONHCH2CH2SO2CH2CH2OSO3H) |
| 20 | (structure with C2H5, CH2-phenyl-SO3H, N-phenyl-N=N-naphthalene-N=N-phenyl-SO2CH2CH2OSO3H) |
| 21 | (structure with C2H5, CH2-phenyl-SO3H, N-phenyl-N=N-naphthalene-N=N-phenyl-SO2CH2CH2OSO3H) |
| 22 | (structure with CH3 on ring, C2H5, CH2-phenyl-SO3H, N-phenyl-N=N-naphthalene-N=N-phenyl-CONHCH2CH2SO2CH2CH2OSO3H) |

TABLE 3-continued
| Example | Dye |
|---|---|
| 23 | 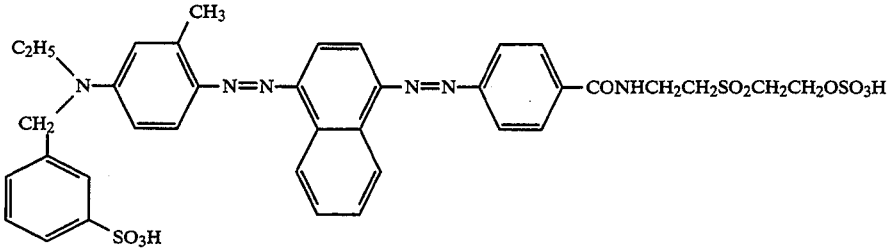 |
| 24 | 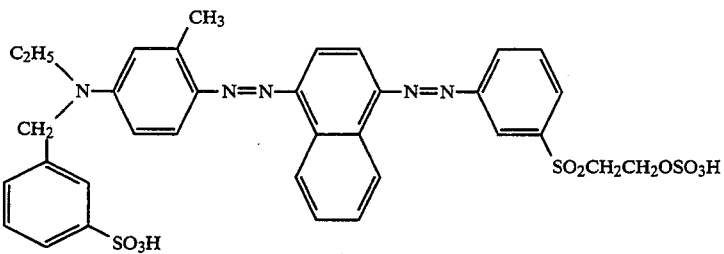 |
| 25 | 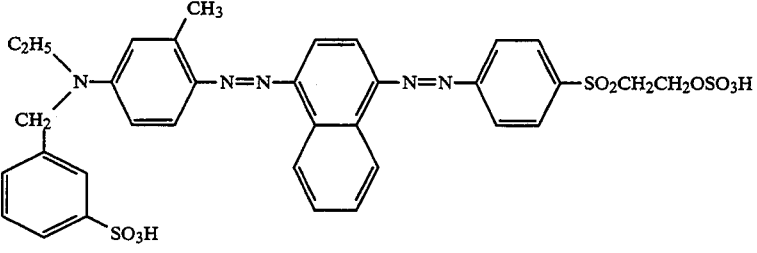 |
| 26 | 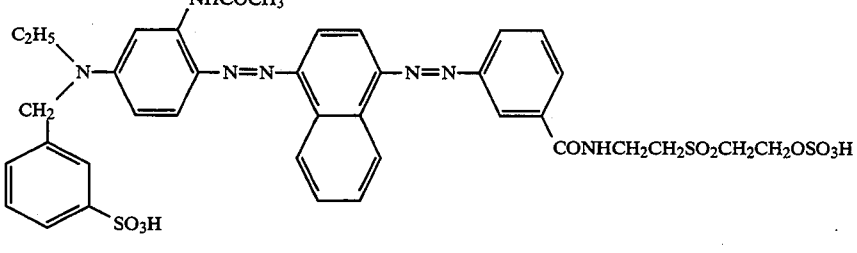 |
| 27 | 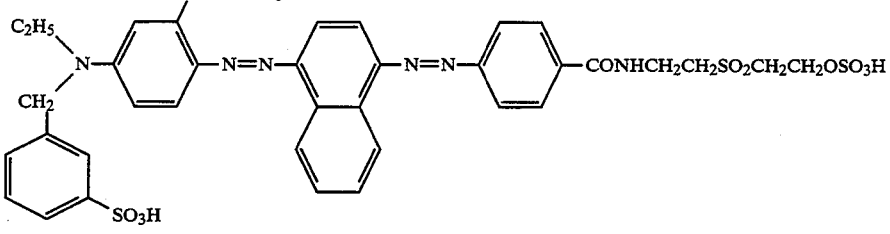 |
| 28 | 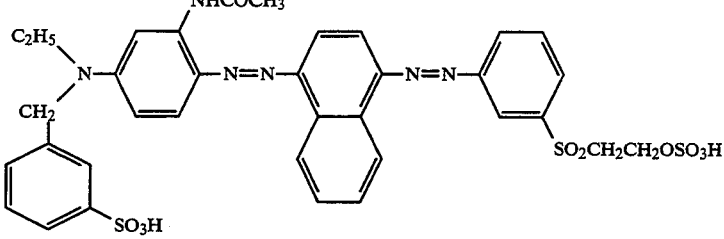 |

TABLE 3-continued

| Example | Dye |
|---|---|
| 29 |  |

EXAMPLES 30 TO 32

Example 18 is repeated, except that an equimolar amount of 5-(2-sulfatoethylsulfonyl)aniline-2-sulfonic acid is used instead of 32 parts of 3-amino-N-(2-sulfatoethylsulfonylethyl)benzamide and an equimolar amount of N-ethyl-N-benzylaniline, N-ethyl-N-benzyl-3-methylaniline or N-ethyl-N-benzyl-3-acetylaminoaniline is used instead of 30 parts of N-ethyl-N-(3-sulfobenzyl)aniline, giving the dyes listed in Table 4 in the form of the free acid, which dye natural and synthetic polyamide fibre material in ruby red hues.

EXAMPLES 33 TO 36

Example 18 is repeated, except that an equimolar amount of 4-amino-N-(2-sulfatoethylsulfonylethyl)benzamide or 3- or 4-(2-sulfatoethylsulfonyl)aniline is used instead of 32 parts of 3-amino-N-(2-sulfatoethylsulfonylethyl)benzamide and an equimolar amount of 1-phenylaminonaphthalene-8-sulfonic acid is used instead of 30 parts of N-ethyl-N-(3-sulfobenzyl)aniline, giving the dyes listed in Table 5 in the form of the free acid, which dye natural and synthetic polyamide fibre material in navy hues.

TABLE 4

| Example | Dye |
|---|---|
| 30 | 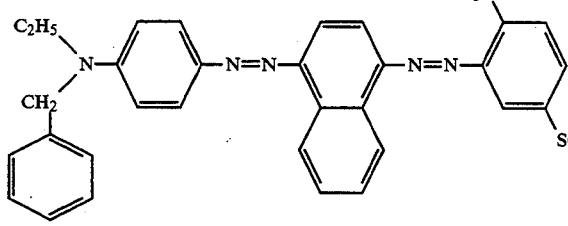 |
| 31 | 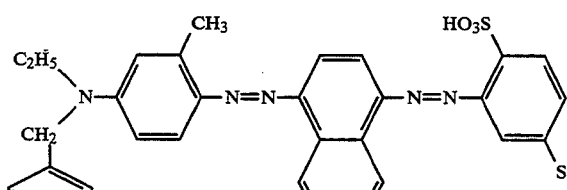 |
| 32 | 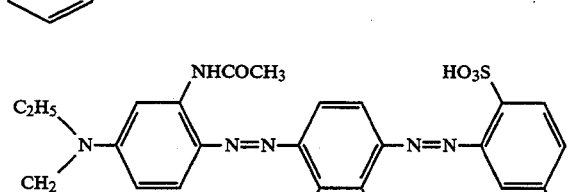 |

TABLE 5

| Example | Dye |
|---------|-----|
| 33 | Ph-NH-[naphthalene(HO3S)]-N=N-[naphthalene]-N=N-C6H4-CONHCH2CH2SO2CH2CH2OSO3H |
| 34 | Ph-NH-[naphthalene(HO3S)]-N=N-[naphthalene]-N=N-C6H4-SO2CH2CH2OSO3H |
| 35 | Ph-NH-[naphthalene(HO3S)]-N=N-[naphthalene]-N=N-C6H4-CONHCH2CH2SO2CH2CH2OSO3H |
| 36 | Ph-NH-[naphthalene(HO3S)]-N=N-[naphthalene]-N=N-C6H4-SO2CH2CH2OSO3H |

EXAMPLE 37

111 parts of o-nitrobenzenesulfonyl chloride are stirred with 135 parts of 3-amino-N-(2-hydroxyethylsulfonylethyl)benzamide in 200 parts of toluene at 25°, and 40 parts of sodium carbonate are added over a period of 30 minutes. The reaction mixture is heated to a temperature of 50° to 55°, stirred at this temperature for another 2 hours, and then diluted with 300 parts of water. The toluene phase is separated off, reduced catalytically with 5 parts of Raney nickel under atmospheric pressure, filtered and evaporated. The residue is sulfated at room temperature in 300 parts of 10% oleum. The reaction paste is poured onto an ice/water mixture, and the amine which corresponds to the compound of the formula

(103)

in the form of the free acid is filtered off with suction.

26.8 parts of the amine of the formula (103) are dissolved in 100 parts of ethanol with heating. 30 parts of 10-normal hydrochloric acid am then added, and the reaction mixture is cooled to a temperature of −10°. 20 parts of an aqeueous 5-molar sodium nitrite solution are then added dropwise, and the mixture is stirred at a temperature of −10° to 0° for 2 hours. One part of sulfamic acid is added to the diazonium salt solution thus obtained, and the mixture is stirred for another 15 minutes.

A second, separate solution is prepared by combining 25 parts of 2-amino-8-hydroxynaphthalene-6-sulfonic acid and 10 parts of tetrahydronaphthalenesulfonic acid in 200 parts of water and 12 parts of 10-normal aqueous sodium hydroxide solution. 10 parts of glacial acetic acid are added to the solution thus obtained, and the diazonium salt solution prepared as described above is added dropwise with stirring, during which the pH is maintained at 4 to 5 by addition of 2-normal aqueous sodium hydroxide solution. Stirring is continued until formation of the dye is complete, and the pH of the reaction mixture is then brought to 9 with 2-normal aqueous sodium hydroxide solution. The suspension is stirred at a temperature of 40° to 45° for another 15 minutes, the precipitated dye is filtered off, washed with dilute sodium chloride solution and dried, giving the dye of the formula

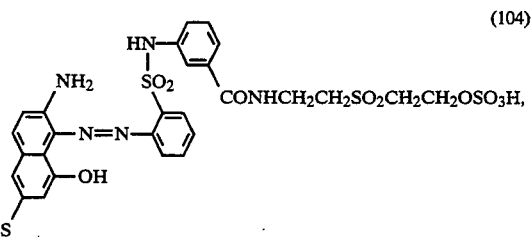

(104)

which dyes natural and synthetic polyamide fibre material in red hues.

EXAMPLES 38 TO 48

Example 37 is repeated, except that, where appropriate, an equimolar amount of 4-amino-N-(2-hydroxyethylsulfonylethyl)benzamide,
3- or 4-methylamino-N-(2-hydroxyethylsulfonylethyl)benzamide,
3- or 4-ethylamino-N-(2-hydroxyethylsulfonylethyl)benzamide,
3- or 4-(2-sulfatoethylsulfonyl)aniline,
3- or 4-(2-sulfatoethylsulfonyl)-N-methylaniline or
3- or 4-(2-sulfatoethylsulfonyl)-N-ethylaniline is used instead of 135 parts of 3-amino-N-(2-hydroxyethylsulfonylethyl)benzamide, giving the dyes listed in Table 6 in the form of the free acid, which dye natural and synthetic polyamide fibre material in red hues.

TABLE 6

| Example | Dye |
|---------|-----|
| 38 | ![structure] |
| 39 | ![structure] |
| 40 | ![structure] |
| 41 | ![structure] |

TABLE 6-continued
| Example | Dye |
|---|---|
| 42 | 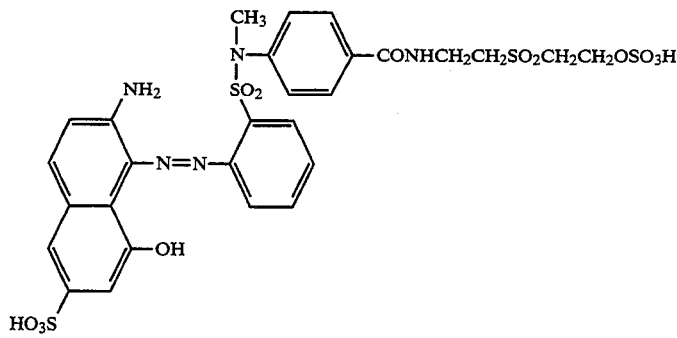 |
| 43 | 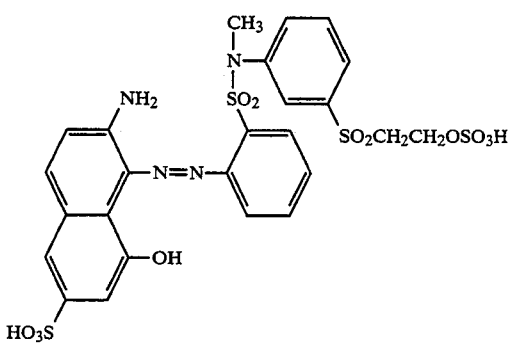 |
| 44 | 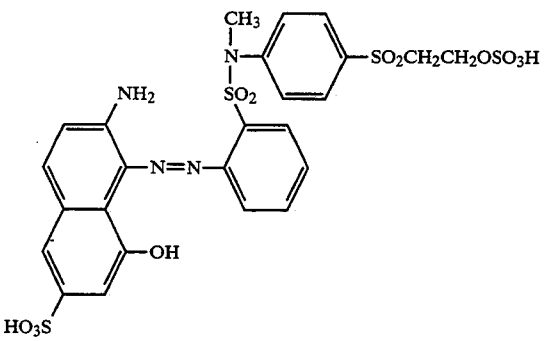 |
| 45 | 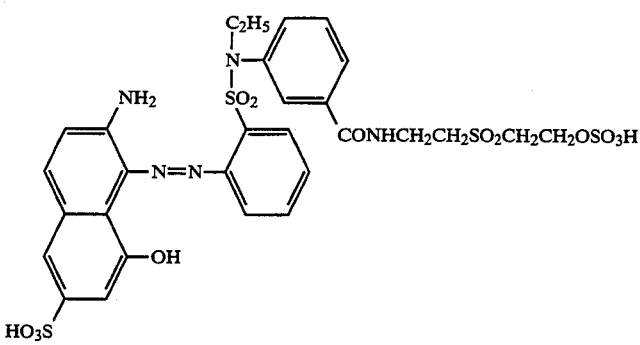 |

TABLE 6-continued

| Example | Dye |
|---|---|
| 46 | 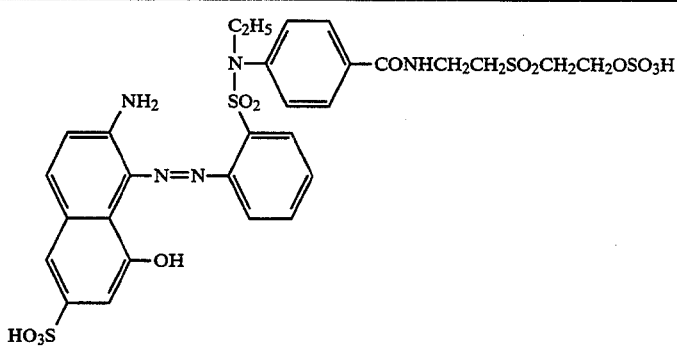 |
| 47 | 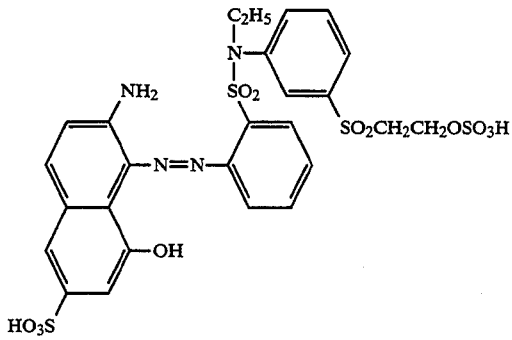 |
| 48 | 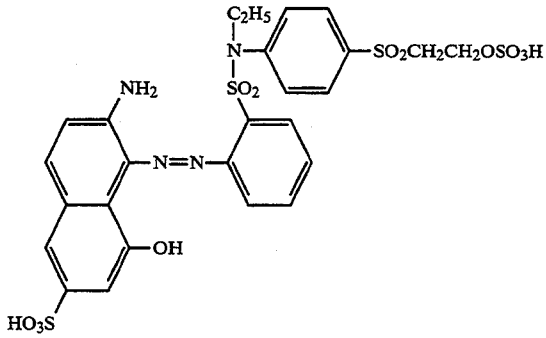 |

EXAMPLE 49 TO 64

Example 37 is repeated, except that, where appropriate, an equimolar amount of
4-amino-N-(2-hydroxyethylsulfonylethyl)benzamide,
3- or 4-methylamino-N-(2-hydroxyethylsulfonylethyl)benzamide,
3- or 4-ethylamino-N-(2-hydroxyethylsulfonylethyl)-benzamide,
3- or 4-(2-sulfatoethylsulfonyl)aniline,
3- or 4-(2-sulfatoethylsulfonyl)-N-methylaniline or
3- or 4-(2-sulfatoethylsulfonyl)-N-ethylaniline
is used instead of 135 parts of 3-amino-N-(2-hydroxyethylsulfonylethyl)benzamide and an equimolar amount of 2-methylindole or 2-phenylindole is used instead of 25 parts of 2-amino-8-hydroxynaphthalene-6-sulfonic acid, giving the dyes listed in Table 7 in the form of the free acid, which dye natural and synthetic polyamide fibre material in yellow hues.

TABLE 7

| Example | Dye |
|---|---|
| 49 | |

TABLE 7-continued
| Example | Dye |
|---|---|
| 50 | 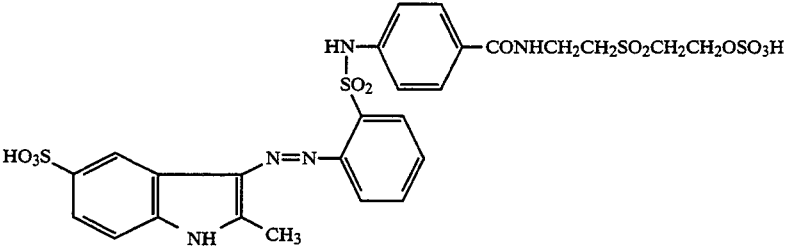 |
| 51 | 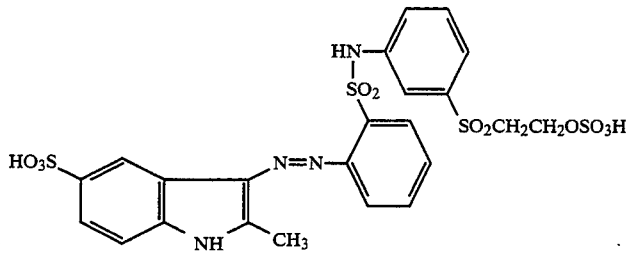 |
| 52 | 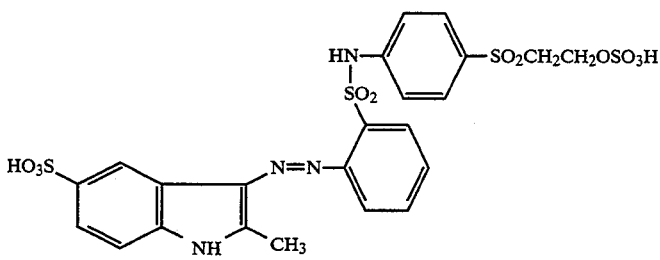 |
| 53 | 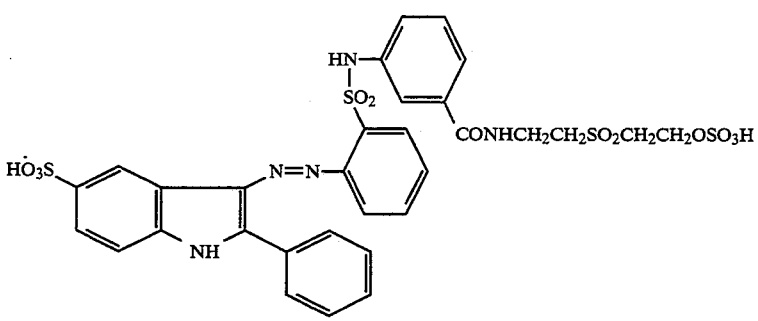 |
| 54 | 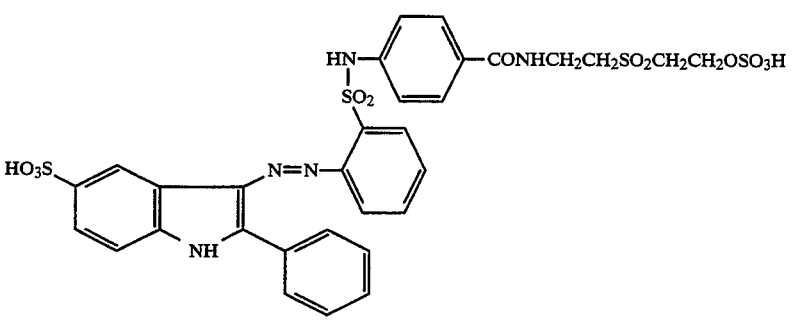 |

TABLE 7-continued
| Example | Dye |
|---|---|
| 55 | 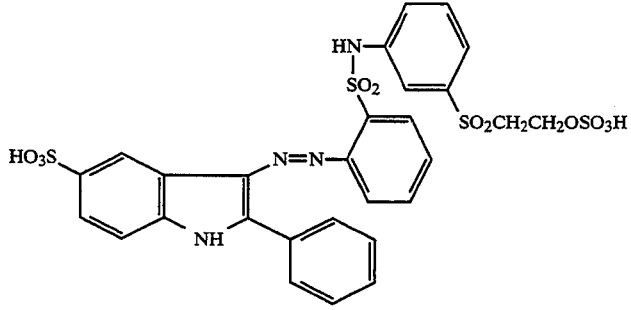 |
| 56 | 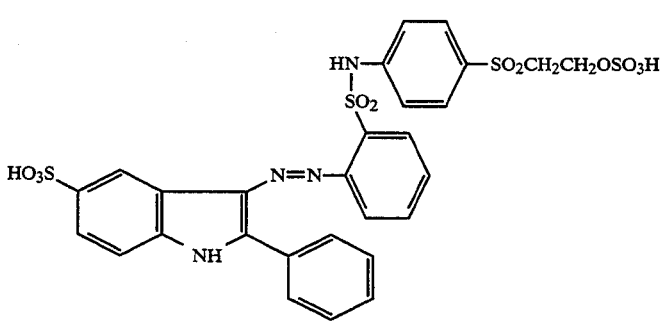 |
| 57 | 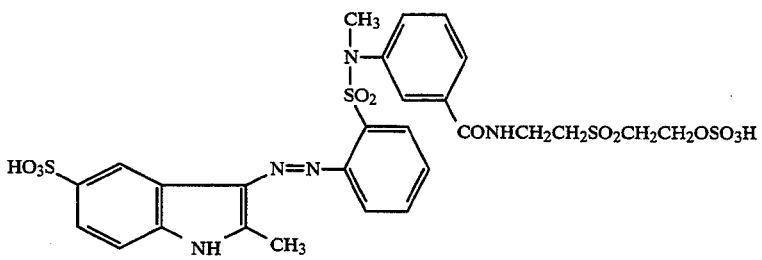 |
| 58 | 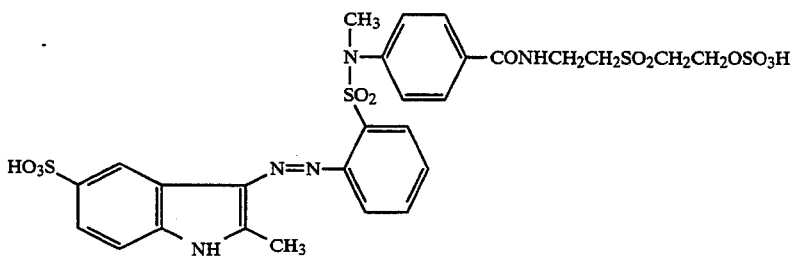 |
| 59 | 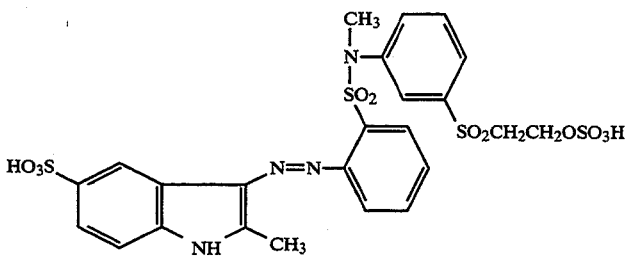 |

TABLE 7-continued

| Example | Dye |
|---|---|
| 60 | 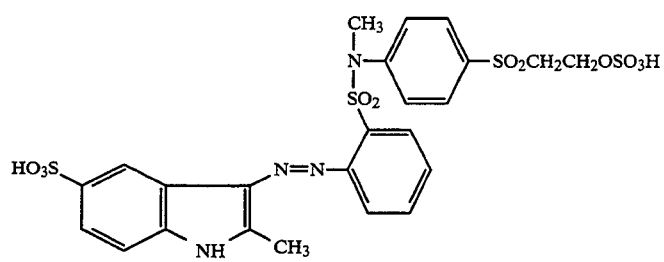 |
| 61 | 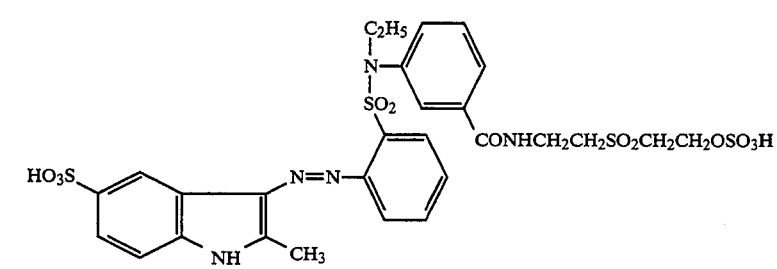 |
| 62 | 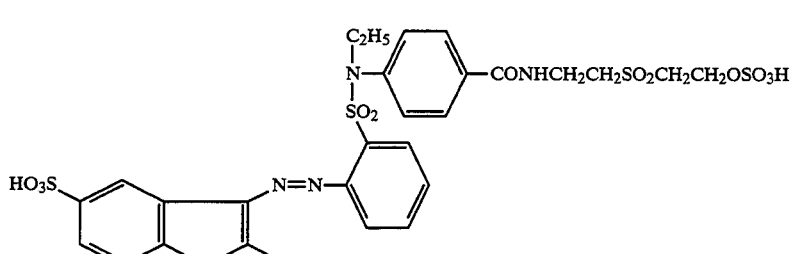 |
| 63 | 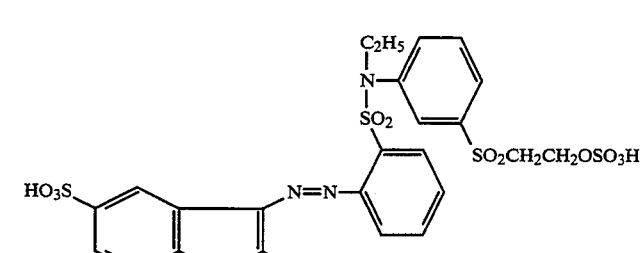 |
| 64 | 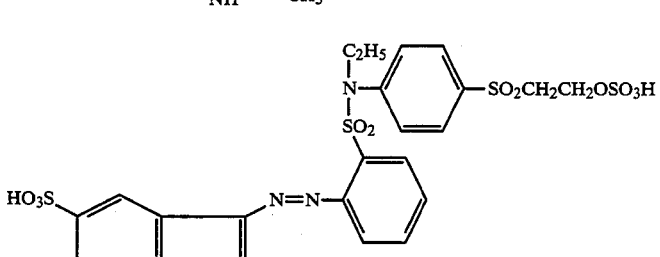 |

EXAMPLE 65

111 parts of m-nitrobenzenesulfonyl chloride are stirred with 135 parts of 3-(2-hydroxyethylsulfonyl)aniline in 200 parts of toluene at 25°, and 40 parts of sodium carbonate are added over a period of 30 minutes. The mixture is heated to a temperature of 50° to 55°, stirred at this temperature for another 2 hours, and then diluted with 300 parts of water. The toluene phase is separated off, reduced catalytically with 5 parts of Raney nickel under atmospheric pressure, filtered and evaporated. The residue is sulfated at room temperature in 300 parts of 10% oleum. The reaction paste is then poured onto an ice/water mixture, and the amine which corresponds to the compound of the formula

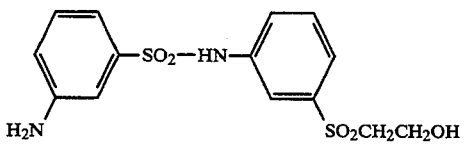

(105)

is filtered off with suction.

60 parts of the amine thus obtained of the formula (105) are added together with 38 parts of 1-amino-4-bromoanthraquinone-2-sulfonic acid to 300 parts of a 1:1 mixture of ethanol/water, and 20 parts of sodium bicarbonate and 0.5 part of a 1:1 mixture of copper powder/copper(I) chloride are added. The reaction mixture is left at a temperature of 80° for 24 hours, during which the reaction product precipitates. It is filtered off with suction, washed with water and dried. 10 parts of the product thus obtained are sulfated at room temperature with 50 parts of 10% oleum. The reaction paste is poured onto an ice/water mixture, resulting in precipitation of the dye. Filtration and drying give a dye which in the form of the free acid corresponds to the compound of the formula

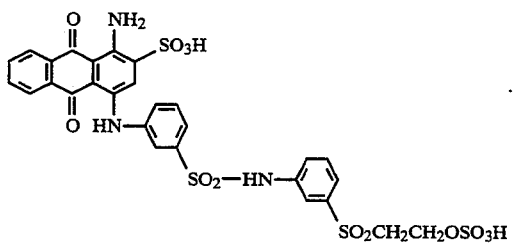

(106)

The dye of the formula (106) dyes natural and synthetic polyamide fibre material in blue hues.

EXAMPLE 66

Example 65 is repeated, except that an equimolar amount of 3-(2-hydroxyethylsulfonyl)-N-ethylaniline is used instead of 135 parts of 3-(2-hydroxyethylsulfonyl)aniline, giving a dye which in the form of the free acid corresponds to the compound of the formula

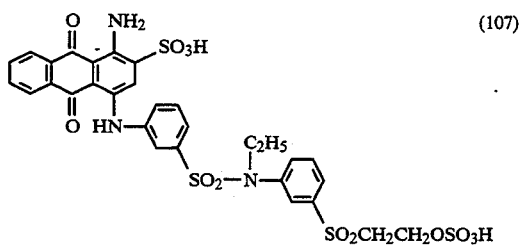

(107)

The dye of the formula (107) dyes natural and synthetic polyamide fibre material in blue hues.

EXAMPLE 67

A neutral, hot solution at 70° to 80° of 28 parts of 4-aminoazobenzene-4'-sulfonic acid in 500 parts of water is run simultaneously with 26 parts of an aqueous 4-normal sodium nitrite solution into a mixture of 28 parts of 32% hydrochloric acid in 200 parts of water, while maintaining the temperature of the reaction mixture at 20° to 25°. After addition is complete, stirring is continued for 2 hours, and the nitrite excess is destroyed with a small amount of sulfamic acid. The reaction mixture thus prepared is slowly run into a cold solution at 0° to 5° of 14 parts of 2,4-hexanedione and 180 parts of sodium acetate in 500 parts of water. After stirring at a temperature of 0° to 5° for several hours, the mixture is warmed to 30° and brought to a pH of 5.5 with sodium acetate in order to complete the reaction. The precipitate is then filtered off with suction and dried.

8 parts of the reaction product prepared by the above procedure are suspended at room temperature in a mixture of 50 parts of glacial acetic acid and 20 parts of water. 2.9 parts of 3-hydrazino-N-(2-hydroxyethylsulfonylethyl)benzamide are added in one portion with stirring. The reaction mixture is slowly heated to a temperature of 100° and stirred until no more starting material can be detected. The reaction product is precipitated with 32% hydrochloric acid, filtered off with suction and dried.

5 parts of the product thus obtained are sulfated at room temperature with 25 parts of 10% oleum. The reaction paste is poured onto an ice/water mixture, resulting in precipitation of the dye. Filtration and drying give a dye which in the form of the free acid corresponds to the compound of the formula

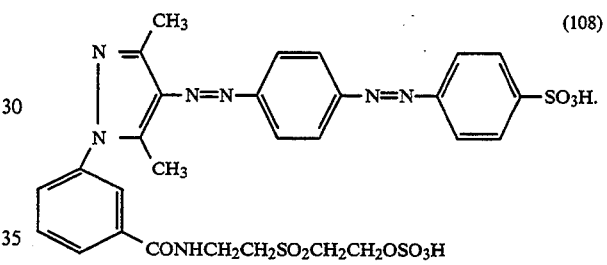

(108)

The dye of the formula (108) dyes natural and synthetic polyamide fibre material in yellow hues.

EXAMPLE 68

Example 67 is repeated, except that an equimolar amount of 3-hydrazino-(2'-hydroxyethylsulfonyl)benzene is used instead of 2.9 parts of 3-hydrazino-N-(2-hydroxyethylsulfonylethyl)benzamide and an equimolar amount of 4-aminoazobenzene-3'-sulfonic acid is used instead of 28 parts of 4-aminoazobenzene-4'-sulfonic acid, giving a dye which in the form of the free acid corresponds to the compound of the formula

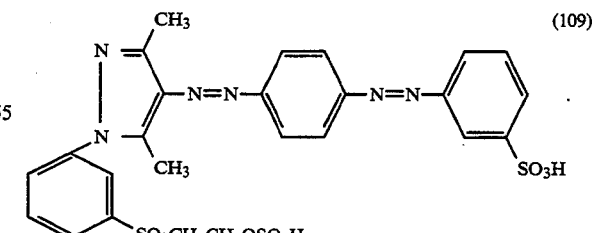

(109)

The dye of the formula (109) dyes natural and synthetic polyamide fibre material in yellow hues.

Dyeing Example 1

10 parts of nylon-6.6 yarn are dyed in an aqueous dye bath at a liquor ratio of 25:1.0.5% of the dye of the formula

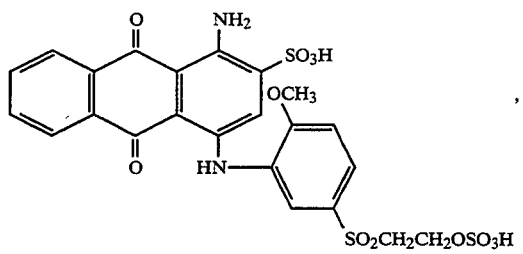
(110)

the amount given being based on the fibre weight, is used as the dye. The dye bath is brought to a pH of 7.0 by addition of an aqueous sodium hydroxide solution, heated to 80° over a period of 15 minutes, and heated from 80° to a temperature of 100° over a period of 30 minutes, during which the pH is constantly maintained at 7.0. Dyeing at a temperature of 100° is continued for 40 minutes. During dyeing, the pH is continuously determined and maintained at 7.0 by addition of an aqueous sodium hydroxide solution. The dyed yarn is then removed from the dye bath and rinsed and dried in a customary manner, giving a yarn dyed in a blue hue. The dyeing is very level and exhibits excellent wet fastness.

In Dyeing Example 1, it is also possible to heat the dye bath from 80° to a temperature of 100° over a period of 20 minutes instead of 30 minutes.

Dyeing Example 1 is repeated, except that an equimolar amount of a dye prepared according to Examples 1 to 68 is used instead of 0.5% of the dye of the formula (110), to give dyeings having the hues listed in the particular example.

Dyeing Examples 2 to 4

Dyeing Example 1 is repeated, except that an equimolar amount of one of the dyes of the formulae

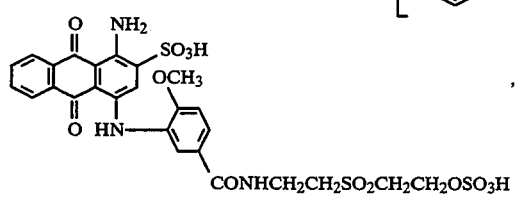
(111)

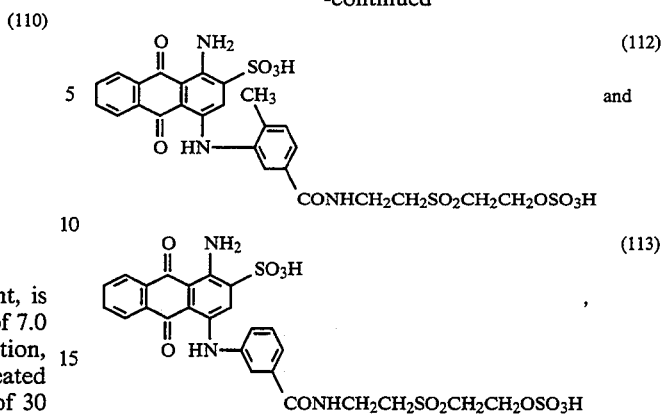

is used instead of 0.5% of the dye of the formula (110), to give dyeings in blue hues.

What is claimed is:

1. A process for dyeing synthetic polyamide fibre materials, which comprises dyeing these fibre materials with a reactive dye of the formula $$HO_3S\text{—}Fa\text{—}X\text{-}(SO_2CH_2CH_2OSO_3H)_m \quad (1),$$

in which Fa is a dye radical, X is a direct bond or a radical of the formula $-CONHCH_2CH_2-$ and m is the number 1 or 2, the dye of the formula (1) containing only one sulfo group, from an aqueous liquor at a pH of 5 to 9 and, to set the dyeing temperature, raising the temperature from 80° C. to at least 95° C. over a period of at least 20 minutes.

2. A process according to claim 1, wherein a reactive dye of the formula (1) is used in which Fa is the radical of a monoazo, polyazo or anthraquinone dye.

3. A process according to claim 1, wherein a reactive dye of the formula

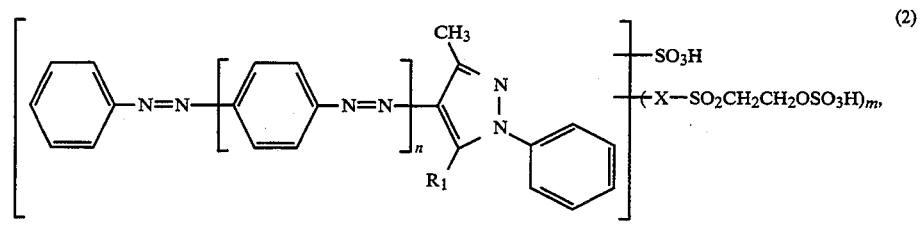
(2)

in which $R_1$ is hydrogen, $C_1$-$C_4$alkyl, amino or hydroxyl and n is the number 0 or 1,

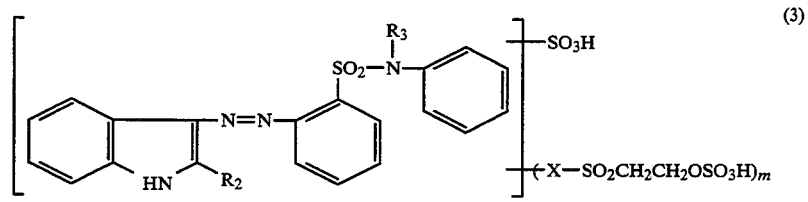
(3)

in which $R_2$ is hydrogen, $C_1$-$C_4$alkyl or phenyl which is unsubstituted or substituted by $C_1$-$C_4$alkyl, $C_1$-$C_4$alkoxy, $C_2$-$C_4$alkanoylamino or halogen, and $R_3$ is hydrogen or $C_1$-$C_4$alkyl,

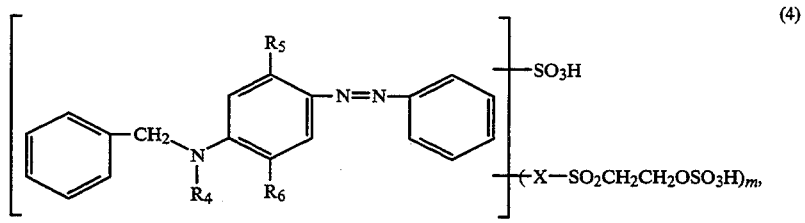
(4)

in which $R_4$ is hydrogen or $C_1$-$C_4$alkyl, $R_5$ and $R_6$ are hydrogen, $C_1$-$C_4$alkyl, $C_1$-$C_4$alkoxy, $C_2$-$C_4$alkanoylamino or halogen, or $R_4$ and $R_6$ together with the atoms linking them form a tetrahydropyridine ring and $R_5$ is hydrogen, $C_1$-$C_4$alkyl, $C_1$-$C_4$alkoxy, $C_2$-$C_4$alkanoylamino or halogen,

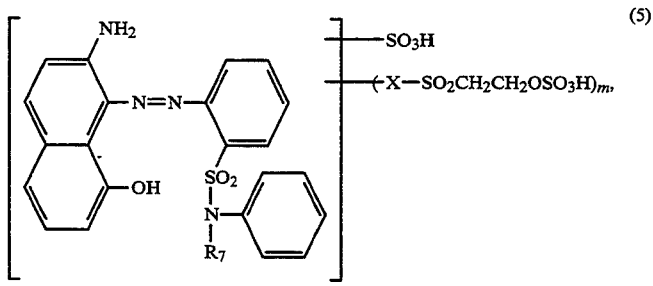
(5)

in which $R_7$ is hydrogen or $C_1$-$C_4$alkyl,

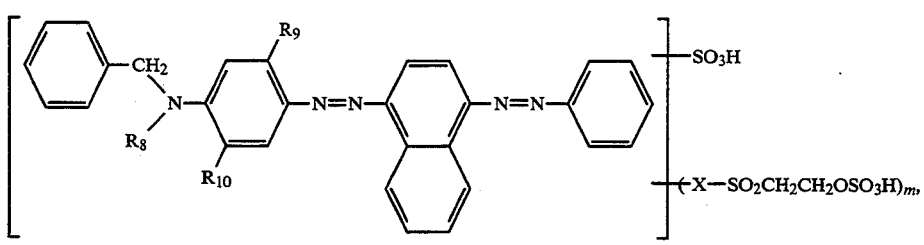
(6)

in which $R_8$ is hydrogen or $C_1$-$C_4$alkyl, $R_9$ and $R_{10}$ are hydrogen, $C_1$-$C_4$alkyl, $C_1$-$C_4$alkoxy, $C_2$-$C_4$alkanoylamino or halogen, or $R_8$ and $R_{10}$ together with the atoms linking them form a tetrahydropyridine ring and $R_9$ is hydrogen, $C_1$-$C_4$alkyl, $C_1$-$C_4$alkoxy, $C_2$-$C_4$alkanoylamino or halogen,

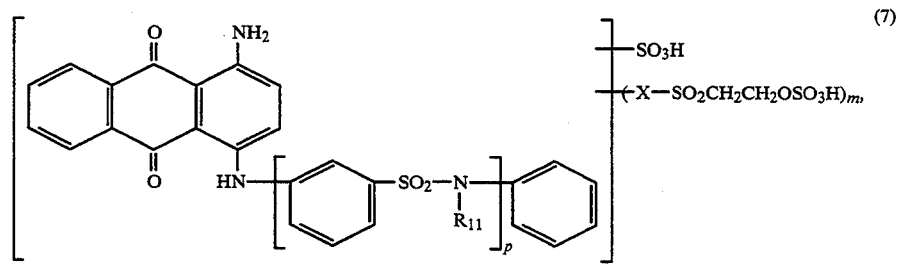
(7)

in which $R_{11}$ is hydrogen or $C_1$-$C_4$alkyl and p is the number 0 or 1, or

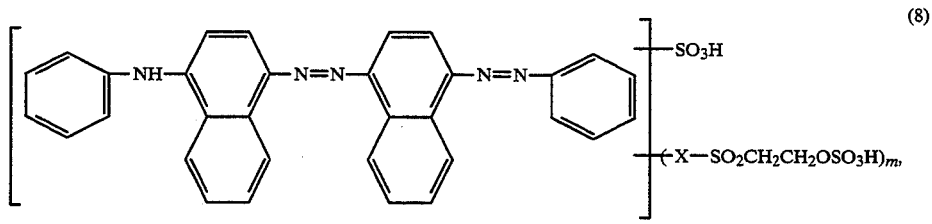
(8)

is used, X in the dyes of the formulae (2) to (8) being a direct bond or a radical of the formula —CONHCH$_2$CH$_2$— and m being the number 1 or 2, and the dyes of the formulae (2) to (8) contain no further substituents or are further substituted by $C_1$-$C_4$alkyl, $C_1$-$C_4$alkoxy, $C_2$-$C_4$alkanoylamino or halogen.

4. A process according to claim 1, wherein a reactive dye of the formula (1) is used in which m is the number 1.

5. A process according to claim 1, wherein dyeing is carried out by the exhaust method.

6. A process according to claim 1, wherein dyeing is carried out at a temperature of 95° to 102° C.

7. A process according to claim 1, wherein the dyeing temperature is set by raising the temperature from 80° C. to 95°-102° C. over a period of at least 20 minutes.

8. A process according to claim 1, wherein dyeing is carried out in the presence of a buffer, or an amount of a base necessary for keeping the pit constant is metered in during dyeing.

9. A process according to claim 1, wherein dyeing is carried out at a pH of 5.5 to 8.

10. A process according to claim 1, wherein dyeing is carried out by the exhaust method at a temperature of 95° to 102° C., in the presence of a buffer, or an amount of a base necessary for keeping the pH constant is metered in during dyeing, and, to set the dyeing temperature, the temperature is raised from 80° C. to 95°-102° C. over a period of at least 20 minutes.

11. A process according to claim 1, wherein the dyeing temperature is set by raising the temperature from 80° C. to 95°-102° C. over a period of at least 30 minutes.

12. A reactive dye of the formula

$HO_3S$—Fa'—X—$SO_2CH_2CH_2OSO_3H$ (17), in which X is a direct bond or a radical of the formula —$CONHCH_2CH_2$— and Fa' is a radical of the formula

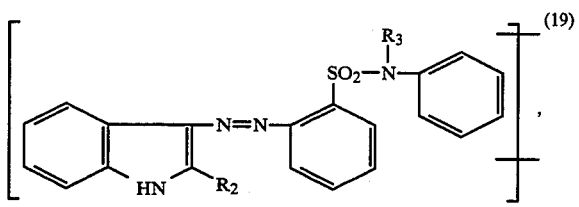
(18)

in which $R_1$ is hydrogen, $C_1$-$C_4$alkyl, amino or hydroxyl and n is the number 0 or 1 ist, X being a radical of the formula —$CONHCH_2CH_2$— in the case where n is the number 0, or

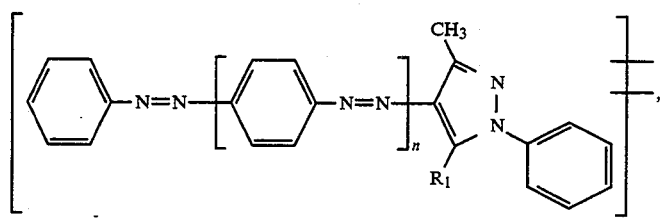
(19)

in which $R_2$ is hydrogen, $C_1$-$C_4$alkyl or phenyl which is unsubstituted or substituted by $C_1$-$C_4$alkyl, $C_1$-$C_4$alkoxy, $C_2$-$C_4$alkanoylamino or halogen, and $R_3$ is hydrogen or $C_1$-$C_4$alkyl, or

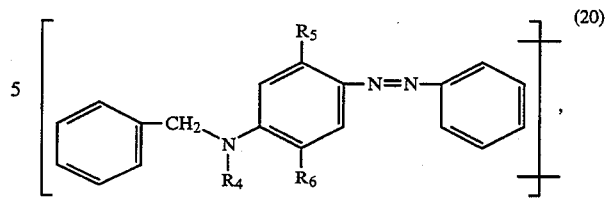
(20)

in which $R_4$ is hydrogen or $C_1$-$C_4$alkyl, $R_5$ and $R_6$ are hydrogen, $C_1$-$C_4$alkyl, $C_1$-$C_4$alkoxy, $C_2$-$C_4$alkanoylamino or halogen, or $R_4$ and $R_6$ together with the atoms linking them form a tetrahydropyridine ring and $R_5$ is hydrogen, $C_1$-$C_4$alkyl, $C_1$-$C_4$alkoxy, $C_2$-$C_4$alkanoylamino or halogen, or

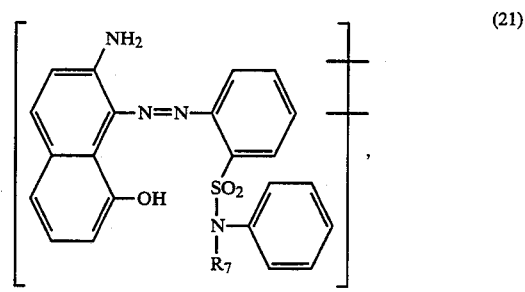
(21)

in which $R_7$ is hydrogen or $C_1$-$C_4$alkyl, or

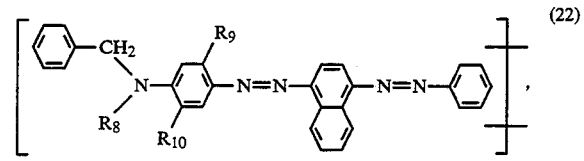
(22)

in which $R_8$ is hydrogen or $C_1$-$C_4$alkyl, $R_9$ and $R_{10}$ are hydrogen, $C_1$-$C_4$alkyl, $C_1$-$C_4$alkoxy, $C_2$-$C_4$alkanoylamino or halogen, or $R_8$ and $R_{10}$ together with the atoms linking them form a tetrahydropyridine ring and $R_9$ is hydrogen, $C_1$-$C_4$alkyl, $C_1$-$C_4$alkoxy, $C_2$-$C_4$alkanoylamino or halogen, or

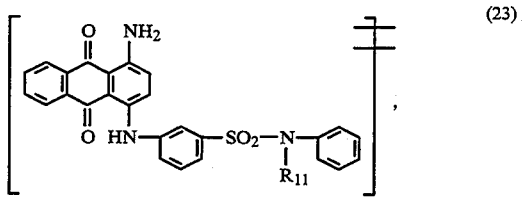
(23)

in which $R_{11}$ is hydrogen or $C_1$-$C_4$alkyl, or

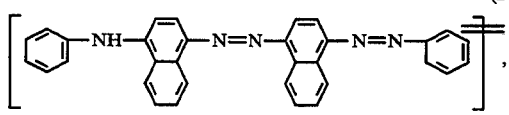 (24)

the radicals Fa' of the formulae (18) to (24) being each unsubstituted or substituted, independently of one another, by C₁–C₄alkyl, C₁–C₄alkoxy, C₂–C₄alkanoylamino or halogen, or a reactive dye of the formula

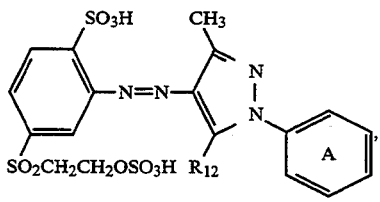 (25)

in which R₁₂ is amino or hydroxyl and benzene ring A is unsubstituted or substituted by C₁–C₄alkyl, C₁–C₄alkoxy, C₂–C₄alkanoylamino or halogen.

13. A reactive dye according to claim 12 of the formula

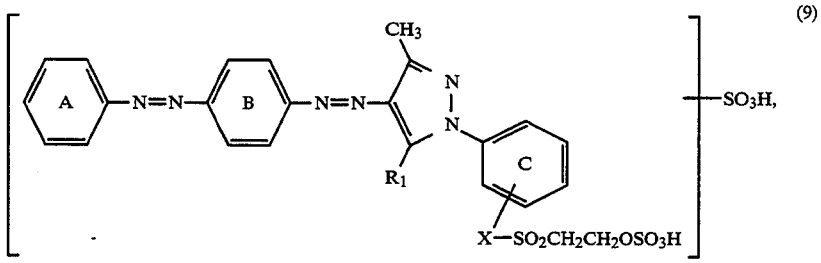 (9)

in which R₁ is C₁–C₄alkyl, benzene rings A, B and C, independently of one another, are unsubstituted or substituted by C₁–C₄alkyl, C₁–C₄alkoxy, C₂–C₄alkanoylamino or halogen, and X is a direct bond or a radical of the formula —CONHCH₂CH₂—.

14. A reactive dye according to claim 12 of the formula

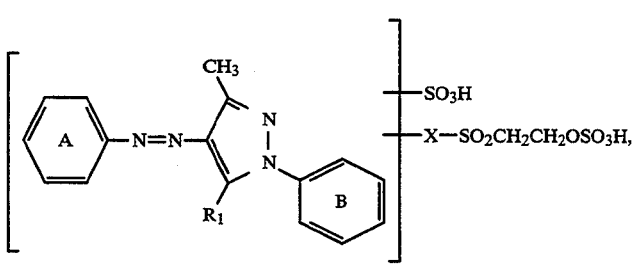 (10)

in which R₁ is amino or hydroxyl, benzene rings A and B, independently of one another, are unsubstituted or substituted by C₁–C₄alkyl, C₁–C₄alkoxy, C₂–C₄alkanoylamino or halogen, and X is a radical of the formula —CONHCH₂CH₂—.

15. A reactive dye according to claim 12 of the formula

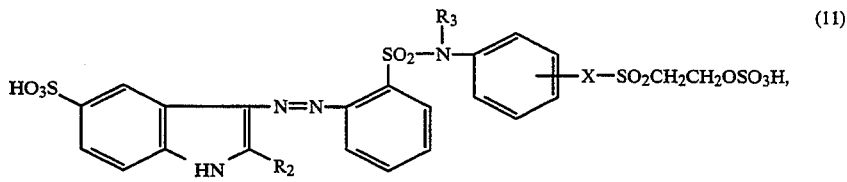 (11)

in which R₂ is C₁–C₄alkyl or phenyl, R₃ is hydrogen or C₁–C₄alkyl and X is a direct bond or a radical of the formula —CONHCH₂CH₂—.

16. A reactive dye according to claim 12 of the formula

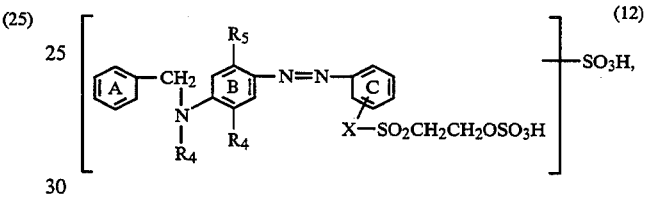 (12)

in which R₄ is hydrogen or C₁–C₄ally, R₅ is hydrogen, C₁–C₄alkyl, C₁–C₄alkoxy or C₂–C₄alkanoylamino, R₆ is hydrogen, C₁–C₄alkyl, C₁–C₄alkoxy or halogen, X is a direct bond or a radical of the formula —CONHCH₂CH₂—, benzene ring C is unsubstituted or substituted by C₁–C₄alkyl, C₁–C₄alkoxy or halogen, and the sulfo group is bonded to benzene ring A, B or C.

17. A reactive dye according to claim 12 of the formula

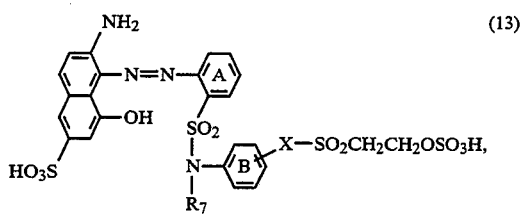
(13)

in which R₇ is hydrogen or C₁–C₄alkyl, X is a direct bond or a radical of the formula —CONHCH₂CH₂—, and benzene rings A and B, independently of one another, are unsubstituted or substituted by C₁–C₄alkyl, C₁–C₄alkoxy or halogen.

18. A reactive dye according to claim 12 of the formula

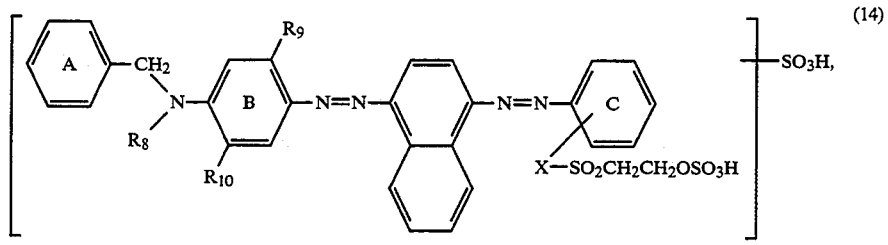
(14)

in which R₈ is hydrogen or C₁–C₄alkyl, R₉ is hydrogen, C₁–C₄alkyl, C₁–C₄alkoxy or C₂–C₄alkanoylamino, R₁₀ is hydrogen, C₁–C₄alkyl, C₁–C₄alkoxy or halogen, X is a direct bond or a radical of the formula —CONHCH₂CH₂—, benzene rings A, B and C, independently of one another, are unsubstituted or substituted by C₁–C₄alkyl, C₁–C₄alkoxy or halogen, and the sulfo group is bonded to benzene ring A, B or C.

19. A reactive dye according to claim 12 of the formula

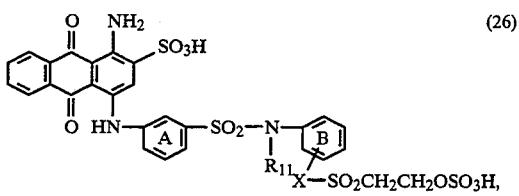
(26)

in which R₁₁ is hydrogen or C₁–C₄alkyl, X is a direct bond or a radical of the formula —CONHCH₂CH₂—, and benzene rings A and B, independently of one another, are unsubstituted or substituted by C₁–C₄alkyl, C₁–C₄alkoxy or halogen.

20. A reactive dye according to claim 12 of the formula

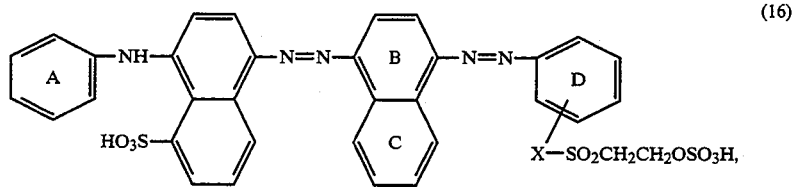
(16)

in which X is a direct bond or a radical of the formula —CONHCH₂CH₂—, and benzene rings A, B, C and D, independently of one another, are unsubstituted or substituted by C₁–C₄alkyl, C₁–C₄alkoxy or halogen.

* * * * *